(12) United States Patent
Yang et al.

(10) Patent No.: US 10,554,373 B2
(45) Date of Patent: *Feb. 4, 2020

(54) DATA TRANSMISSION METHOD AND DATA TRANSMISSION DEVICE

(71) Applicant: Huawei Technologies Co., Ltd., Shenzhen (CN)

(72) Inventors: Xun Yang, Shenzhen (CN); Chixiang Ma, Shanghai (CN); Yunbo Li, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/045,214

(22) Filed: Jul. 25, 2018

(65) Prior Publication Data
US 2018/0331812 A1    Nov. 15, 2018

Related U.S. Application Data

(63) Continuation of application No. 15/160,897, filed on May 20, 2016, now Pat. No. 10,063,362, which is a continuation of application No. PCT/CN2013/087657, filed on Nov. 22, 2013.

(51) Int. Cl.
*H04W 4/00* (2018.01)
*H04L 5/00* (2006.01)
*H04W 24/02* (2009.01)
*H04W 28/06* (2009.01)
*H04W 74/08* (2009.01)

(52) U.S. Cl.
CPC .......... *H04L 5/0094* (2013.01); *H04L 5/0053* (2013.01); *H04W 24/02* (2013.01); *H04W 28/065* (2013.01); *H04W 74/08* (2013.01)

(58) Field of Classification Search
None
See application file for complete search history.

(56) References Cited

U.S. PATENT DOCUMENTS

| 8,971,350 B1 * | 3/2015 | Liu ...................... H04L 5/0094 370/445 |
| 9,350,520 B2 | 5/2016 | Kondylis et al. |
| 9,912,388 B2 * | 3/2018 | Chu ...................... H04B 7/0452 |
| 2002/0082013 A1 * | 6/2002 | Lee ...................... H04W 52/40 455/436 |

(Continued)

FOREIGN PATENT DOCUMENTS

| CN | 101208923 A | 6/2008 |
| CN | 101577969 A | 11/2009 |
| CN | 102625464 A | 8/2012 |

*Primary Examiner* — Elisabeth Benoit Magloire
(74) *Attorney, Agent, or Firm* — Leydig, Voit & Mayer, Ltd.

(57) ABSTRACT

A data transmission method and a data transmission device are disclosed. The method comprises: sending, by a transmitting end, a channel request frame to a first receiving end on at least two sub-channels; parsing, by a receiving end after receiving a channel response frame from the first receiving end, the channel response frame to obtain second channel indication information; determining that the sub-channel on which the channel response frame is transmitted is idle; and sending data to the first receiving end on the sub-channel that is determined to be idle.

6 Claims, 14 Drawing Sheets

(56) References Cited

U.S. PATENT DOCUMENTS

| | | | |
|---|---|---|---|
| 2004/0095964 A1* | 5/2004 | Meylan | H04L 1/1642 370/506 |
| 2012/0099664 A1 | 4/2012 | Cheong et al. | |
| 2012/0106426 A1 | 5/2012 | Hart et al. | |
| 2012/0163331 A1 | 6/2012 | Chan et al. | |
| 2012/0314583 A1 | 12/2012 | Hart et al. | |
| 2013/0294289 A1* | 11/2013 | Kneckt | H04W 72/082 370/254 |
| 2014/0064229 A1* | 3/2014 | Lee | H04W 48/16 370/329 |
| 2014/0355557 A1 | 12/2014 | Peng et al. | |
| 2015/0055615 A1 | 2/2015 | Cordeiro et al. | |
| 2015/0373685 A1 | 12/2015 | Seok et al. | |
| 2017/0290060 A1 | 10/2017 | Kim et al. | |

* cited by examiner

DATA TRANSMISSION METHOD AND DATA TRANSMISSION DEVICE

CROSS REFERENCE TO RELATED APPLICATIONS

This application is a continuation of U.S. patent application Ser. No. 15/160,897, filed on May 20, 2016, which is a continuation of International Application No. PCT/CN2013/087657, filed on Nov. 22, 2013. All of the afore-mentioned patent applications are hereby incorporated by reference in their entireties.

TECHNICAL FIELD

Embodiments of the present invention relate to the technical field of communication, and in particular to a data transmission method and a data transmission device.

BACKGROUND

There are generally multidimensional methods for increasing a transmission rate of a communication system, for example, increasing transmit power, increasing system bandwidth and increasing spectrum efficiency. According to Shannon's Capacity Formula, increasing system bandwidth is a relatively easy method with the most significant effect. Therefore, the system bandwidth is increased as much as possible for most communication systems. On the other hand, since spectrum resources for wireless communication systems are rare and non-renewable, dedicated frequency bands are very expensive. At present, a mobile communication system operator can effectively operate a mobile communication network such as a Long Term Evolution (LTE) network if the operator can obtain a bandwidth of 100 MHz.

How to effectively use the spectrum resources as much as possible is an important direction for wireless communication systems. Further, there are two methods for improving the utilization of spectrum resources in this direction. One is to improve the spectrum efficiency by means of a physical layer (PHY), for example, improving the spectrum efficiency by increasing a modulation order, increasing a coding rate by using better code words, and forming parallel paths by using space resources in a manner of multiple input multiple output (MIMO). The other one is to improve the efficiency of utilization of spectrum resources by a link or a network, by designing mechanisms such as media access control (MAC) layer scheduling and channel access.

The present application mainly refers to the latter one, that is, an effective solution to utilize spectrum resources in a contention-based access network. For example, in a current Wireless Fidelity (WiFi) system, a data transmitting end uses a dynamic Request to Send/Clear to Send (RTS/CTS) method to better learn which sub-channels are idle and available currently. Specifically, RTSs are sent in multiple continuous sub-channels to request the use of the sub-channels; the receiving end, upon receipt of an RTS on a corresponding sub-channel, replies with a CTS after determining that the channel is idle; and the transmitting end learns the specific channel idleness state based on the received CTS. In order to enhance reliability of the mechanism, bandwidth information is carried in both the RTS and the CTS to indicate a bandwidth currently requested. For example, there are four continuous channels 1, 2, 3, and 4, where channel 3 is busy and the other channels are idle. In the solution, limited bits (3 bits) are used to indicate the bandwidth (BW); therefore, neither the receiving end nor the transmitting end supports a discrete multi-channel signal. In this case, if the receiving end determines that channel 3 is busy, the receiving end can reply with a CTS on only channel 1 and channel 2 even though channel 4 is idle. The transmitting end transmits data to the receiving end on channel 1 and channel 2 based on the CTS fed back by the receiving end.

In addition, since 3 bits are used to indicate BW in the solution, a continuous bandwidth which can be indicated by the 3 bits is extremely limited, which is described as follows: With reference to BW and a location of a primary channel, the transmitting end can communicate with the receiving end in only five modes: 20 MHz of the primary channel, 40 MHz including the primary channel, 80 MHz including the primary channel, continuous 160 MHz including the primary channel and non-continuous 160 MHz including the primary channel, and a frequency point of a secondary channel (some channels which are not the primary channel) must be higher than a frequency point of the primary channel, otherwise these possible combinations cannot be indicated.

In the foregoing solution, 3 bits are used to indicate BW, and combinations of non-continuous sub-channels cannot be indicated by the 3 bits in view of a location relationship of frequency bands. Even if the foregoing solution is applied to continuous sub-channels, not all continuous bandwidth combinations can be indicated. For example, a bandwidth of 60 MHz consisting of continuous sub-channels cannot be indicated. In conclusion, the foregoing solution for indicating sub-channels is greatly limited and cannot indicate all combinations of sub-channels.

SUMMARY

A data transmission method and a data transmission device are provided according to embodiments of the present invention, which are used to indicate all combinations of various sub-channels.

A first aspect of the embodiments of the present invention provides a data transmission method, including:

transmitting, by a transmitting end, a channel request frame to a first receiving end on at least two sub-channels;

parsing, by the transmitting end after receiving a channel response frame from the first receiving end, the channel response frame to obtain second channel indication information, where the second channel indication information indicates a sub-channel on which the channel response frame is transmitted; and determining that the sub-channel on which the channel response frame is transmitted is idle; and transmitting data to the first receiving end on the sub-channel that is determined to be idle.

With reference to the implementation manner of the first aspect, in a first possible implementation manner, the sub-channel on which the channel response frame is transmitted, indicated by the second channel indication information, is not continuous.

With reference to the implementation manner of the first aspect, in a second possible implementation manner, the channel request frame further carries first channel indication information, and the first channel indication information indicates the sub-channels on which the channel request frame is transmitted.

With reference to the implementation manner of the first aspect, the first possible implementation manner of the first aspect or the second possible implementation manner of the first aspect, in a third possible implementation manner, before the transmitting data to the first receiving end on the sub-channel that is determined to be idle, the method further includes:

determining whether the sub-channel that is idle is capable of being used adequately; transmitting the channel request frame to a second receiving end on the at least two sub-channels if the sub-channel that is idle is not capable of being used adequately, or transmitting the data to the first receiving end on the sub-channel that is idle in an orthogonal frequency division multiplexing, orthogonal frequency division multiple access or frequency division multiplexing manner if the sub-channel that is idle is capable of being used adequately.

With reference to the third possible implementation manner of the first aspect, in a fourth possible implementation manner, the determining whether the sub-channel that is idle is capable of being used adequately includes:

determining whether a ratio of a quantity of the sub-channel that is idle to a quantity of the sub-channels on which the channel request frame is transmitted is greater than a predetermined threshold; determining that the sub-channel that is idle is not used adequately if the ratio is greater than the predetermined threshold, or determining that the sub-channel that is idle is capable of being used adequately if the ratio is not greater than the predetermined threshold; or determining whether the sub-channel that is idle includes a primary channel, and determining that the sub-channel that is idle is not used adequately if the sub-channel that is idle does not include the primary channel.

With reference to the implementation manner of the first aspect, the first possible implementation manner of the first aspect or the second possible implementation manner of the first aspect, in a fifth possible implementation manner, the transmitting end is in a first basic service set, and the at least two sub-channels include a sub-channel of a second basic service set.

With reference to the implementation manner of the first aspect, the first possible implementation manner of the first aspect or the second possible implementation manner of the first aspect, in a sixth possible implementation manner, if the transmitting end is an access point of a basic service set, the method further includes:

determining whether the basic service set to which the access point belongs includes a specific terminal acting as a receiving end; if the basic service set to which the access point belongs includes a specific terminal acting as a receiving end, the transmitting, by a transmitting end, a channel request frame to a first receiving end on at least two sub-channels includes: transmitting, by the access point, the channel request frame on all sub-channels of the basic service set; and if the basic service set to which the access point belongs does not include a specific terminal acting as a receiving end, the transmitting, by a transmitting end, a channel request frame to a first receiving end on at least two sub-channels includes: transmitting, by the access point, the channel request frame on an idle sub-channel, in the basic service set, that does not include a primary channel.

With reference to the sixth possible implementation manner of the first aspect, in a seventh possible implementation manner, if it is determined based on the channel response frame that the primary channel of the basic service set is idle, and the basic service set includes a busy sub-channel, it is determined whether busyness of the busy sub-channel is caused by data transmission in the basic service set, and it is determined that the busy sub-channel is an idle sub-channel if the busyness of the busy sub-channel is not caused by data transmission in the basic service set.

A second aspect of the embodiments of the present invention provides a data transmission method, which including:

determining, by a first receiving end, whether the first receiving end is a destination receiving end for a channel request frame after the channel request frame from a transmitting end is received by the first receiving end; and if it is determined that the first receiving end is the destination receiving end for the channel request frame, and a sub-channel corresponding to the request frame is idle, transmitting a channel response frame to the transmitting end on the sub-channel that is idle, where the channel response frame carries second channel indication information and the second channel indication information indicates the sub-channel on which the channel response frame is transmitted; and receiving data from the transmitting end on the sub-channel on which the channel response frame is transmitted.

With reference to the implementation manner of the second aspect, in a first possible implementation manner, the sub-channel on which the channel response frame is transmitted is not continuous.

With reference to the implementation manner of the first aspect, or the first possible implementation manner of the second aspect, in a second possible implementation manner, if the first receiving end determines that the first receiving end is not the destination receiving end for the channel request frame, the method further includes:

receiving a channel response frame from a destination receiving end for the channel request frame after a duration of a short inter-frame space, by listening to the sub-channel corresponding to the channel request frame; and determining that the sub-channel corresponding to the channel request frame is busy, if the channel response frame from the destination receiving end for the channel request frame is received within a packet control function inter-frame space.

With reference to the second possible implementation manner of the second aspect, in a third possible implementation manner, after the receiving a channel response frame from a destination receiving end for the channel request frame, the method further includes:

setting a network allocation vector of the sub-channel corresponding to the channel request frame based on duration indication information in the received channel response frame; and determining that the network allocation vector of the sub-channel corresponding to the channel request frame does not need to be updated, if the channel response frame from the destination receiving end for the channel request frame is not received within the packet control function inter-frame space.

With reference to the implementation manner of the second aspect, or the third possible implementation manner of the second aspect, in a fourth possible implementation manner, if the sub-channel corresponding to the channel request frame is a sub-channel of a second basic service set and a first basic service is a basic service set to which the first receiving end belongs, the method further includes:

before the transmitting a channel response frame to the transmitting end, determining whether the sub-channel corresponding to the channel request frame is available, and transmitting the channel response frame to the transmitting end if the sub-channel corresponding to the channel request frame is available.

With reference to the fourth possible implementation manner of the second aspect, in a fifth possible implementation manner, the determining whether the sub-channel corresponding to the channel request frame is available includes:

determining that the sub-channel corresponding to the channel request frame is available if it is determined that a signal of the second basic service set is not received on the sub-channel corresponding to the channel request frame within a predetermined duration; or determining whether the sub-channel corresponding to the channel request frame is available in a duration requested by the channel request frame, based on a communication state of the second basic service set.

With reference to the fifth possible implementation manner of the second aspect, in a sixth possible implementation manner, the communication record includes:

at least one of terminal cache information, queue information, contention window information, or back off time information of the second basic service set.

With reference to the implementation manner of the second aspect, or the third possible implementation manner of the second aspect, in a seventh possible implementation manner, if the first receiving end is an access point of a basic service set, the method further includes:

determining whether the basic service set to which the access point belongs includes a specific terminal acting as a receiving end; skipping transmitting the channel response frame on any of sub-channels if the basic service set to which the access point belongs includes a specific terminal acting as a receiving end, or transmitting the channel response frame on an idle sub-channel, in the basic service set to which the access point belongs, that does not include a primary channel, if the basic service set to which the access point belongs does not include a specific terminal acting as a receiving end.

With reference to the seventh possible implementation manner of the second aspect, in an eighth possible implementation manner, the method further includes:

indicating channel idleness and that a back off process is to be continued, if the primary channel and all sub-channels are idle; and indicating channel busyness and keeping suspending a back off process if the primary channel is idle, a part of sub-channels in the basic service set to which the access point belongs are busy and busyness of the part of sub-channels is caused by data transmission in the basic service set.

A third aspect of the embodiments of the present invention provides a data transmission device, including:

a request transmitting unit, configured as a transmitting end to transmit a channel request frame to a first receiving end on at least two sub-channels;

a response receiving unit, configured to receive a channel response frame from the first receiving end after the channel request frame is transmitted by the request transmitting unit;

an idleness determining unit, configured to parse the channel response frame to obtain second channel indication information after the channel response frame from the first receiving end is received by the response receiving unit, where the second channel indication information indicates a sub-channel on which the channel response frame is transmitted; and determine that the sub-channel on which the channel response frame is transmitted is idle; and a data transmitting unit, configured to transmit data to the first receiving end on the sub-channel that is determined to be idle by the idleness determining unit.

With reference to the implementation manner of the third aspect, in a first possible implementation manner, the sub-channel on which the channel response frame is transmitted, indicated by the second channel indication information obtained by parsing by the idleness determining unit, is not continuous.

With reference to the implementation manner of the third aspect, in a second possible implementation manner, the channel request frame transmitted by the request transmitting unit further carries first channel indication information, and the first channel indication information indicates the sub-channels on which the channel request frame is transmitted.

With reference to the implementation manner of the third aspect, the first possible implementation manner of the third aspect or the second possible implementation manner of the third aspect, in a third possible implementation manner, the data transmission device further includes:

an adequacy determining unit, configured to determine whether the sub-channel that is determined to be idle by the idleness determining unit is capable of being used adequately; and the request transmitting unit is further configured to transmit the channel request frame to a second receiving end on the at least two sub-channels if the adequacy determining unit determines that the sub-channel that is idle is not capable of being used adequately; and the data transmitting unit is configured to transmit the data to the first receiving end on the sub-channel that is idle in an orthogonal frequency division multiplexing, orthogonal frequency division multiple access or frequency division multiplexing manner if the adequacy determining unit determines that the sub-channel that is idle is capable of being used adequately.

With reference to the third possible implementation manner of the third aspect, in a fourth possible implementation manner, the adequacy determining unit is configured to determine whether a ratio of a quantity of the sub-channel that is idle to a quantity of the sub-channels on which the channel request frame is transmitted is greater than a predetermined threshold; and determine that the sub-channel that is idle is not used adequately if the ratio is greater than the predetermined threshold, or determine that the sub-channel that is idle is capable of being used adequately if the ratio is not greater than the predetermined threshold; or determine whether the sub-channel that is idle includes a primary channel, and determine that the sub-channel that is idle is not used adequately if the sub-channel that is idle does not include the primary channel.

With reference to the implementation manner of the third aspect, the first possible implementation manner of the third aspect or the second possible implementation manner of the third aspect, in a fifth possible implementation manner, the data transmission device is in a first basic service set; and the at least two sub-channels on which the channel request frame is transmitted by the request transmitting unit include a sub-channel of a second basic service set.

With reference to the implementation manner of the third aspect, the first possible implementation manner of the third aspect or the second possible implementation manner of the third aspect, in a sixth possible implementation manner, if the data transmission device is an access point of a basic service set, the data transmission device further includes:

a first terminal determining unit, configured to determine whether the basic service set to which the access point belongs includes a specific terminal acting as a receiving end; and the request transmitting unit is configured to transmit the channel request frame on all sub-channels of the basic service set if the first terminal determining unit determines that the basic service set to which the access point belongs includes a specific terminal acting as a receiving end; and transmit the channel request frame on an idle sub-channel, in the basic service set, that does not include a primary channel, if the first terminal determining unit determines that the basic service set to which the access point belongs does not include a specific terminal acting as a receiving end.

With reference to the sixth possible implementation manner of the third aspect, in a seventh possible implementation manner, the idleness determining unit is further configured to, if it is determined based on the channel response frame that the primary channel of the basic service set is idle, and the basic service set includes a busy sub-channel, determine whether busyness of the busy sub-channel is caused by data transmission in the basic service set, and determine that the busy sub-channel is an idle sub-channel if the busyness of the busy sub-channel is not caused by data transmission in the basic service set.

A fourth aspect of the embodiments of the present invention provides a data transmission device, including:

a request receiving unit, configured as a first receiving end to receive a channel request frame from a transmitting end;

a destination determining unit, configured to determine whether the data transmission device is a destination receiving end for the channel request frame after the channel request frame from the transmitting end is received by the request receiving unit;

a response transmitting unit, configured to, if the destination determining unit determines that the data transmission device is the destination receiving end for the channel request frame, and a sub-channel corresponding to the request frame is idle, transmit a channel response frame to the transmitting end on the sub-channel that is idle, where the channel response frame carries second channel indication information and the second channel indication information indicates the sub-channel on which the channel response frame is transmitted; and a data receiving unit, configured to receive data from the transmitting end on the sub-channel on which the channel response frame is transmitted by the response transmitting unit.

With reference to the implementation manner of the fourth aspect, in a first possible implementation manner, the sub-channel on which the channel response frame is transmitted by the response transmitting unit is not continuous.

With reference to the implementation manner of the fourth aspect, or the first possible implementation manner of the fourth aspect, in a second possible implementation manner, the data transmission device further includes:

a listening unit, configured to receive a channel response frame from a destination receiving end for the channel request frame after a duration of a short inter-frame space, by listening to the sub-channel corresponding to the channel request frame, if the destination determining unit determines that the first receiving end is not the destination receiving end for the channel request frame; and a busyness determining unit, configured to determine that the sub-channel corresponding to the channel request frame is busy, if the channel response frame from the destination receiving end for the channel request frame is received by the listening unit within a packet control function inter-frame space.

With reference to the second possible implementation manner of the fourth aspect, in a third possible implementation manner, the data transmission device further includes:

a vector setting unit, configured to set a network allocation vector of the sub-channel corresponding to the channel request frame based on duration indication information in the channel response frame received by the listening unit; and determine that the network allocation vector of the sub-channel corresponding to the channel request frame does not need to be updated if the channel response frame from the destination receiving end for the channel request frame is not received by the listening unit within the packet control function inter-frame space.

With reference to the implementation manner of the fourth aspect, or the third possible implementation manner of the fourth aspect, in a fourth possible implementation manner, the data transmission device further includes:

a channel determining unit, configured to determine whether the sub-channel corresponding to the channel request frame is a sub-channel of a second basic service set, where a first basic service set is a basic service set to which the first receiving end belongs; and an availability determining unit, configured to determine whether the sub-channel corresponding to the channel request frame is available if the channel determining unit determines that the sub-channel corresponding to the channel request frame is a sub-channel of the second basic service set; and the response transmitting unit is configured to transmit the channel response frame to the transmitting end if the availability determining unit determines that the sub-channel corresponding to the channel request frame is available.

With reference to the fourth possible implementation manner of the fourth aspect, in a fifth possible implementation manner, the availability determining unit is configured to determine that the sub-channel corresponding to the channel request frame is available if it is determined that a signal of the second basic service set is not received on the sub-channel corresponding to the channel request frame within a predetermined duration; or determine whether the sub-channel corresponding to the channel request frame is available in a duration requested by the channel request frame, based on a communication state of the second basic service set.

With reference to the fifth possible implementation manner of the fourth aspect, in a sixth possible implementation manner, a communication record used by the availability determining unit to determine whether the sub-channel is available includes: at least one of terminal cache information, queue information, contention window information, or back off time information of the second basic service set.

With reference to the implementation manner of the fourth aspect, or the third possible implementation manner of the fourth aspect, in a seventh possible implementation manner, if the data transmission device is an access point of a basic service set, the data transmission device further includes:

a second terminal determining unit, configured to determine whether the basic service set to which the access point belongs includes a specific terminal acting as a receiving end; and the response transmitting unit is configured to skip transmitting the channel response frame on any of sub-channels if the second terminal determining unit determines that the basic service set to which the access point belongs includes a specific terminal acting as a receiving end; or transmit the channel response frame on an idle sub-channel, in the basic service set to which the access point belongs, that does not include a primary channel, if the second terminal determining unit determines that the basic service set to which the access point belongs does not include a specific terminal acting as a receiving end.

With reference to the seventh possible implementation manner of the fourth aspect, in an eighth possible implementation manner, the data transmission device further includes:

a back off process controlling unit, configured to indicate channel idleness and that a back off process is to be continued, if the primary channel and all sub-channels are idle; or indicate channel busyness and keep suspending a back off process if the primary channel is idle, a part of sub-channels in the basic service set to which the access point belongs are busy and busyness of the part of sub-channels is caused by data transmission in the basic service set.

From the foregoing solutions, it can be learned that a channel response frame from a receiving end carries second channel indication information, and the second channel indication information may indicate a sub-channel on which the channel response frame is transmitted. In this way, the transmitting end can learn on which sub-channels the channel response frame is transmitted and determine that the sub-channels are idle, without being limited to continuous bandwidth combinations indicated by 3 bits. Therefore, restriction of a location relationship of frequency bands can be overcome, and all combinations of various sub-channels can be indicated.

BRIEF DESCRIPTION OF DRAWINGS

To describe the technical solutions in the embodiments of the present invention more clearly, the following briefly describes the accompanying drawings required for describing the embodiments. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

In order to make the objective, the technical solutions, and the advantages of the present invention clearer, the present invention is further described in detail with reference to the accompanying drawings. Apparently, the described embodiments are merely some but not all of embodiments of the present invention. All other embodiments obtained by persons of ordinary skill in the art based on the embodiments of the present invention without any creative efforts fall within the protection scope of the present invention.

Figure 1:
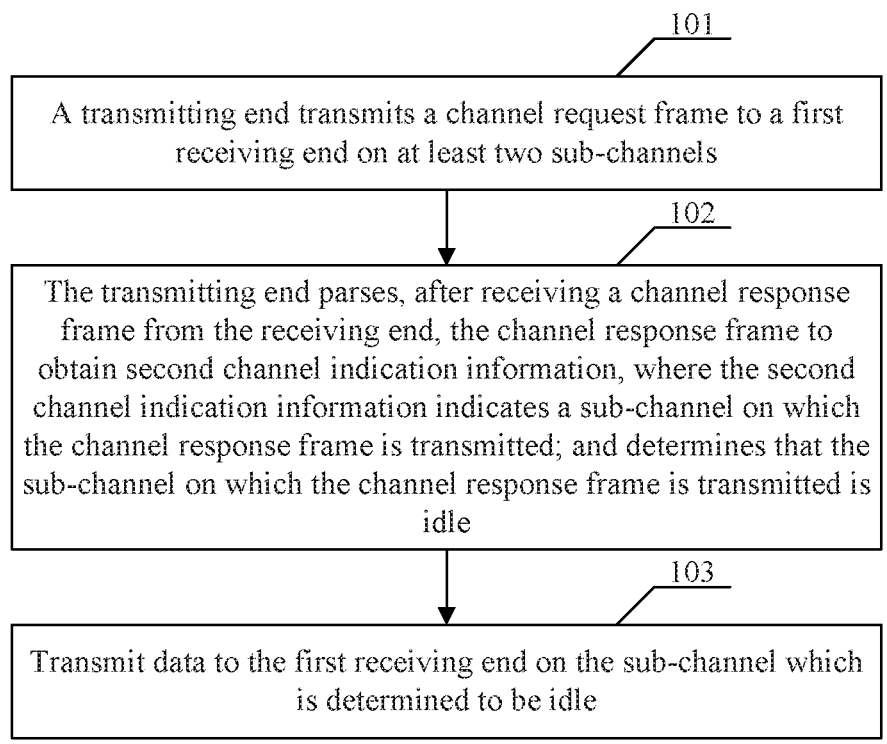
FIG. 1 is a schematic flowchart of a method according to an embodiment of the present invention.

A data transmission method is provided according to an embodiment of the present invention. The method includes the following steps 101 to 103, as shown in FIG. 1.

In 101, a transmitting end transmits a channel request frame to a first receiving end on at least two sub-channels.

Further, the channel request frame further carries first channel indication information, and the first channel indication information indicates the sub-channels on which the channel request frame is transmitted.

By using the first channel indication information to indicate the sub-channels on which the channel request frame is transmitted, the receiving end can obtain more reliable information. Even if the channel request frame is not received on some sub-channels, the receiving end can still learn, from the information, the channels on which the channel request frame is transmitted by the transmitting end.

Optionally, an embodiment of the present invention further provides a case of applying the solution of the embodiment of the present invention to an overlapping basic service set (OBSS) scenario, to further improve utilization efficiency of the network spectrum. The embodiment places emphasis on, a basic service set (BSS) further using an idle channel of a neighbor BSS to assist temporary transmission of a larger amount of data in the OBSS scenario. Specifically, the transmitting end is in a first basic service set, and the at least two sub-channels include a sub-channel of a second basic service set. That is, the first basic service set is a basic service set to which the foregoing transmitting end belongs, and the second basic service set is a basic service set other than the foregoing first basic service set. A detailed description will be given in the third embodiment in the following.

Optionally, an embodiment of the present invention further provides a case of applying the solution of the embodiment of the present invention to an OBSS scenario, to further improve utilization efficiency of the network spectrum. The embodiment places emphasis on, a BSS further using an idle channel of the BSS itself in the OBSS scenario. Specifically, if the foregoing transmitting end is an access point of a basic service set, the step 101 further includes, before the channel request frame is transmitted, determining whether the basic service set to which the access point belongs includes a specific terminal acting as a receiving end; if the basic service set to which the access point belongs includes a specific terminal acting as a receiving end, the transmitting, by a transmitting end, a channel request frame to a first receiving end on at least two sub-channels includes: transmitting, by the access point, the channel request frame on all sub-channels of the basic service set; and if the basic service set to which the access point belongs does not include a specific terminal acting as a receiving end, the transmitting, by a transmitting end, a channel request frame to a first receiving end on at least two sub-channels includes: transmitting, by the access point, the channel request frame on an idle sub-channel, in the basic service set, that does not include a primary channel. A detailed description will be given in the fourth embodiment in the following.

The specific terminal refers to a terminal that does not use or does not support the process of the method illustrated in FIG. 1.

In 102, upon receipt of a channel response frame from the first receiving end, the transmitting end parses the channel response frame to obtain second channel indication information, where the second channel indication information indicates a sub-channel on which the channel response frame is transmitted, and the transmitting end determines that the sub-channel on which the channel response frame is transmitted is idle.

In this step, by indicating, in the channel response frame, the sub-channel on which the channel response frame is transmitted, the transmitting end can obtain more reliable information. Even if the channel response frame is not received on some sub-channels, the receiving end can still learn, from the information, whether the transmitting end transmits the channel response frame on these sub-channels.

Specifically, the sub-channels on which the channel response frame is transmitted, indicated by the second channel indication information, are not continuous. Based on the description in the background, the solution in the background can only use continuous idle frequency bands, which wastes frequency band resources. Specifically, in the example in the background, channel 4 is wasted, so that utilization efficiency of the frequency band resources in the technical solution of the background is low. In the embodiment, the idle sub-channels corresponding to the channel response frame received by the transmitting end are not continuous, that is, the channel response frame is received by the transmitting end on discrete sub-channels, therefore the transmitting end can accurately determine whether the sub-channels are idle and then transmit data on idle sub-channels in a discrete manner, thereby avoiding the waste of channel resources and improving the utilization efficiency of the frequency band resources.

Further, an embodiment of the present invention further provides an implementation solution for channel determination before the data is transmitted as follows: Before transmitting data to the first receiving end on the sub-channel that is determined to be idle, the method further includes: determining whether the idle sub-channel can be used adequately. If the idle sub-channels cannot be used adequately, the channel request frame is transmitted to a second receiving end on the at least two sub-channels. If the idle sub-channels can be used adequately, the process of transmitting the data in the following step 103 includes: transmitting the data to the first receiving end on the idle sub-channels in a manner of orthogonal frequency division multiplexing, orthogonal frequency division multiple access or frequency division multiplexing. A detailed description will be given in the second embodiment in the following.

In the embodiment, if the situation that the current idle sub-channels cannot be used adequately occurs multiple times, the step of "transmitting the channel request frame to a second receiving end on the at least two sub-channels" will be repeatedly performed.

Optionally, an embodiment of the present invention further provides a process of determining whether the current idle sub-channel can be used adequately. Specifically, determining whether the idle sub-channel can be used adequately includes:

determining whether a ratio of a quantity of the idle sub-channel to a quantity of the sub-channels on which the channel request frame is transmitted is greater than a predetermined threshold, determining that the idle sub-channels are not used adequately if the ratio is greater than the predetermined threshold, and determining that the idle sub-channels can be used adequately if the ratio is not greater than the predetermined threshold; or determining whether the idle sub-channels include a primary channel and determining that the idle sub-channels are not used adequately if the idle sub-channels do not include the primary channel.

Further, an embodiment of the present invention further provides another solution to determine whether the sub-channels are idle in a scenario with a primary channel. Specifically, if it is determined based on the channel response frame that the primary channel of the basic service set is idle, and the basic service set includes a busy sub-channel, it is determined whether busyness of the busy sub-channel is caused by data transmission in the basic service set, and it is determined that the busy sub-channel is an idle sub-channel if the busyness of the busy sub-channel is not caused by data transmission in the basic service set. A detailed description of the solution will be given after the fourth embodiment.

In 103, data is transmitted to the first receiving end on the sub-channel that is determined to be idle.

In the embodiment of the present invention, a channel response frame from a receiving end carries second channel indication information, and the second channel indication information may indicate a sub-channel on which the channel response frame is transmitted. In this way, the transmitting end can learn on which sub-channels the channel response frame is transmitted and determine that the sub-channels are idle, without being limited to continuous bandwidth combinations indicated by 3 bits. Therefore, restriction of a location relationship of frequency bands can be overcome, and all combinations of various sub-channels can be indicated.

Figure 2:
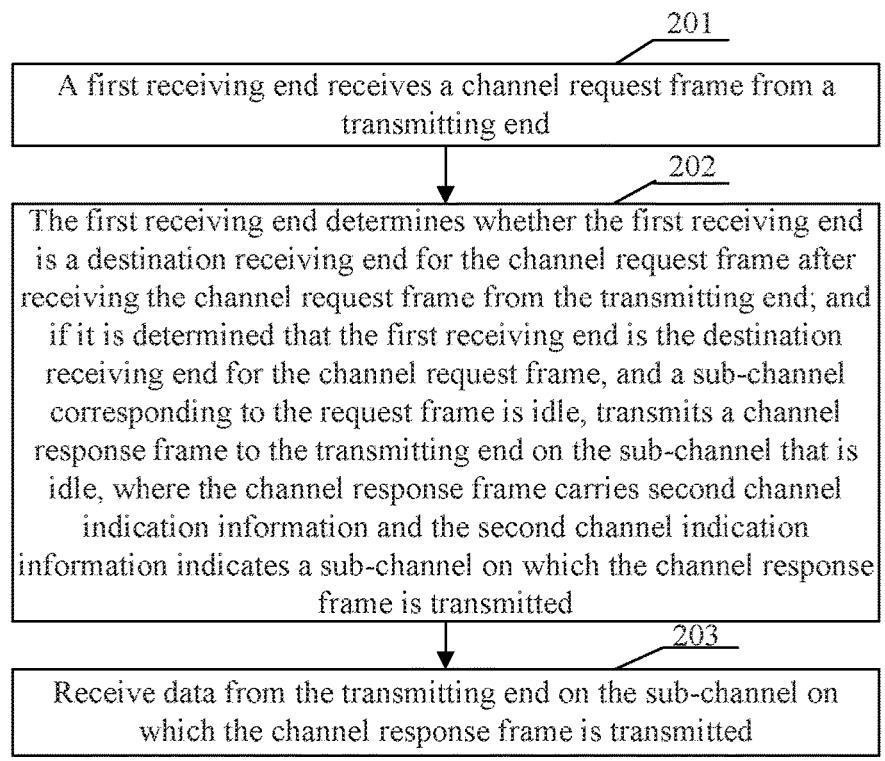
FIG. 2 is a schematic flowchart of a method according to an embodiment of the present invention.

Another data transmission method is provided according to an embodiment of the present invention. The method includes the following steps 201 to 203, as shown in FIG. 2.

In 201, a first receiving end receives a channel request frame from a transmitting end.

The channel request frame may be received on at least two sub-channels.

In 202, upon receipt of the channel request frame from the transmitting end, the first receiving end determines whether the first receiving end itself is a destination receiving end for the channel request frame. If it is determined that the first receiving end is the destination receiving end for the channel request frame and a sub-channel corresponding to the channel request frame is idle, the first receiving end transmits a channel response frame to the transmitting end on the idle sub-channel. The channel response frame carries second channel indication information, and the second channel indication information indicates the sub-channel on which the channel response frame is transmitted.

In the step, by using the second channel indication information to indicate the sub-channel on which the channel response frame is transmitted, the transmitting end can obtain more reliable information. Even if the response frame or the request frame is not received on some sub-channels, the receiving end can still learn, from the information, the channels on which the response frame or the request frame is transmitted by the transmitting end.

Specifically, in the step, the sub-channel on which the channel response frame is transmitted, indicated by the second channel indication information, is not continuous. Based on the description in the background, the solution in the background can only use continuous idle frequency bands, which wastes frequency band resources. Specifically, in the example in the background, channel 4 is wasted, so that utilization efficiency of the frequency band resources in the technical solution of the background is low. In the embodiment, the idle sub-channels corresponding to the channel response frame received by the transmitting end are not continuous, that is, the channel response frame is received by the transmitting end on discrete sub-channels, therefore the transmitting end can accurately determine whether the sub-channels are idle and then transmit data on idle sub-channels in a discrete manner, thereby avoiding the waste of channel resources and improving the utilization efficiency of the frequency band resources.

Further, an embodiment of the present invention further provides a solution for a situation in which the receiving end receiving the request frame is not the destination receiving end for the request frame, as follows: If the first receiving end determines that the first receiving end is not the destination receiving end for the channel request frame, the method further includes:

receiving a channel response frame from a destination receiving end for the channel request frame after a duration of a short inter-frame space, by listening to the sub-channel corresponding to the channel request frame; and determining that the sub-channel corresponding to the channel request frame is busy, if the channel response frame from the destination receiving end for the channel request frame is received within a packet control function inter-frame space.

Further, an embodiment of the present invention further provides a solution to update a network allocation vector. Specifically, after the receiving a channel response frame from a destination receiving end for the channel request frame, the method further includes:

setting a network allocation vector of the sub-channel corresponding to the channel request frame based on duration indication information in the received channel response frame; and determining that the network allocation vector of the sub-channel corresponding to the channel request frame does not need to be updated, if the channel response frame from the destination receiving end for the channel request frame is not received within the packet control function inter-frame space.

Further, an embodiment of the present invention further provides a case of applying the solution of the embodiment of the present invention to an overlapping basic service set (OBSS) scenario, to further improve utilization efficiency of the network spectrum. The embodiment places emphasis on, a basic service set (BSS) further using an idle channel of a neighbor BSS to assist temporary transmission of a larger amount of data in the OBSS scenario. Specifically, if the sub-channels corresponding to the channel request frame are sub-channels of a second basic service set and a first basic service set is a basic service set to which the first receiving end belongs, the method further includes, before the transmitting a channel response frame to the transmitting end, determining whether the sub-channel corresponding to the channel request frame is available, and transmitting the channel response frame to the transmitting end if the sub-channel corresponding to the channel request frame is available. A detailed description will be given in the third embodiment in the following.

Optionally, an embodiment of the present invention further provides a solution to determine whether the sub-channel is available. Specifically, determining whether the sub-channel corresponding to the channel request frame is available includes:

determining that the sub-channel corresponding to the channel request frame is available if it is determined that a signal of the second basic service set is not received on the sub-channel corresponding to the channel request frame within a predetermined duration; or determining whether the sub-channel corresponding to the channel request frame is available in a duration requested by the channel request frame, based on a communication state of the second basic service set.

Optionally, an embodiment of the present invention provides an optional solution for the communication state. Specifically, the communication record includes at least one of terminal cache information, queue information, contention window information, or back off time information of the second basic service set. It should be noted that any communication state which can be used to determine whether the sub-channel is available can be used, and the foregoing examples should not be interpreted as limitation to the embodiment of the present invention.

Further, an embodiment of the present invention further provides a case of applying the solution of the embodiment of the present invention to an OBSS scenario, to further improve utilization efficiency of the network spectrum. The embodiment places emphasis on, a BSS further using an idle channel of the BSS itself in the OBSS scenario. Specifically, if the foregoing first receiving end is an access point of a basic service set, the method further includes, before the step 202, determining whether the basic service set to which the access point belongs includes a specific terminal acting as a receiving end; skipping transmitting the channel response frame on any of sub-channels if the basic service or transmitting the channel response frame on an idle sub-channel, in the basic service set to which the access point belongs, that does not include a primary channel, if the basic service set to which the access point belongs does not include a specific terminal acting as a receiving end. A detailed description will be given in the fourth embodiment in the following. The foregoing specific terminal refers to a terminal that does not use or does not support the process of the method illustrated in FIG. 1.

In 203, data from the transmitting end is received on the sub-channel on which the channel response frame is transmitted.

In the embodiment of the present invention, a channel response frame transmitted from a receiving end carries second channel indication information and the second channel indication information may flexibly indicate a sub-channel on which the channel response frame is transmitted. In this way, the transmitting end can learn on which sub-channels the channel response frame is transmitted and determine that the sub-channels are idle, without being limited to continuous bandwidth combinations indicated by 3 bits. Therefore, restriction of a location relationship of frequency bands can be overcome, and all combinations of various sub-channels can be indicated.

Further, an embodiment of the present invention further provides a method to control a back off process. The foregoing method further includes:

indicating channel idleness and that a back off process is to be continued, if the primary channel and all sub-channels are idle; and indicating channel busyness and keeping suspending a back off process if the primary channel is idle, a part of sub-channels in the basic service set to which the access point belongs are busy and busyness of the part of sub-channels is caused by data transmission in the basic service set. A detailed description will be given in the fourth embodiment in the following.

Four embodiments are illustrated in the following, to illustrate four possible application scenarios of the foregoing embodiment. It should be noted that the embodiments of the present invention may be applied to many application scenarios which do not depart from the spirit of the solutions of the embodiments of the present invention. Illustrations of the following four application scenarios should not be interpreted as exhaustive examples of the application scenarios of the embodiments of the present invention, and should not be interpreted as limitation to the application scenarios of the embodiments of the present invention.

First Embodiment

Figure 3:
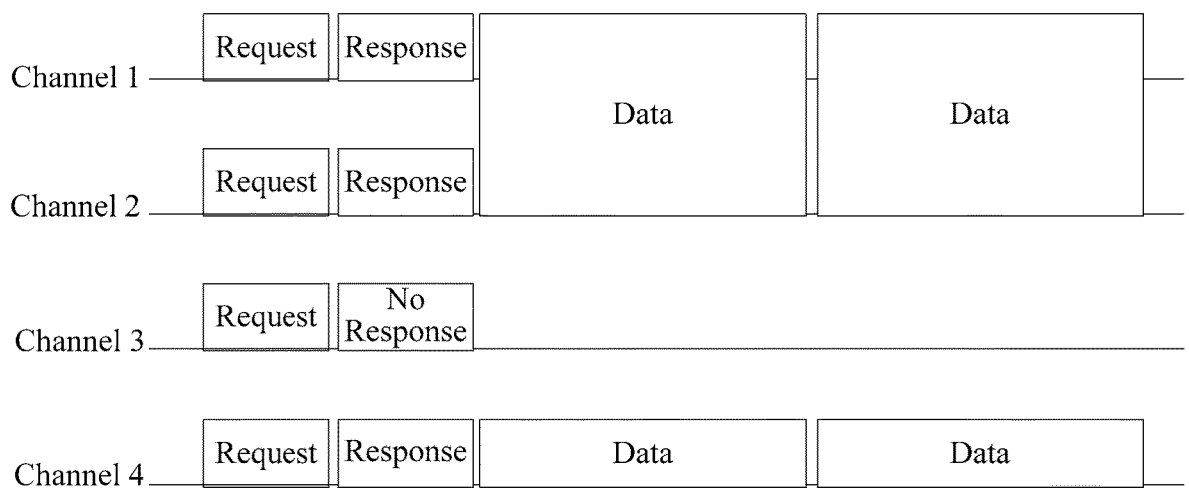
FIG. 3 is a schematic flowchart of determining idleness of discrete channels in a case of a single user according to an embodiment of the present invention.

The embodiment is applied to a single user scenario, and makes improvements on the solution in the background to make it effectively support discrete channels. Reference is made to FIG. 3. FIG. 3 is a schematic diagram of determining idleness of discrete channels in a case of a single user. In FIG. 3, there are four channels which are channels 1 to 4 respectively. In the four channels, the transmitted Request refers to a transmitted channel request frame, a Response or No Response refers to a channel response frame or no channel response frame, data refers to that there is data being transmitted. The process in FIG. 2 may be simply described as follows:

In step 1, a transmitting end transmits a channel request frame (Request) to a receiving end on multiple sub-channels. The channel request frames are preferably in a same format and carry channel indication information to indicate the channels on which the channel request frame is transmitted at this time.

In the step, by using a same format for the channel request frame, it may be convenient for the receiving end to correctly demodulate data upon receipt of data on any one sub-channel.

In step 2, upon receipt of the channel request frame on the sub-channels, the receiving end determines whether the receiving end itself is a destination receiving end for the channel request frame. If the receiving end is the destination receiving end, the receiving end transmits a channel response frame by determining an idleness state of the receiving end itself on the foregoing sub-channels, that is, the receiving end transmits the channel response frame if the channels are idle and does not transmit the channel response frame if the channels are busy. The channel response frames transmitted on the idle sub-channels are preferably in a same format and carry channel indication information to indicate the channels on which the channel response frame is transmitted at this time.

By indicating, in the channel response frame, the sub-channel on which the channel response frame is transmitted, the transmitting end can obtain more reliable information. Even if the response frame is not received on some sub-channels, the receiving end can still learn, from the information, the channels on which the response frame is transmitted by the transmitting end.

In step 3, the transmitting end receives the channel response frame on the sub-channels on which the channel request frame is transmitted, and transmits data to the receiving end on the sub-channels on which the channel response frame is received. It can be understood that, no channel response frame is received on channel 3, hence no data is transmitted on channel 3 in the subsequent process of transmitting data.

In the embodiment, for the step 2, there is a further step to solve the case in which the receiving end is not the destination receiving end as follows:

If the foregoing receiving end is not the destination receiving end, the receiving end further receives a channel response frame (the channel response frame is transmitted by the destination receiving end. The non-destination receiving end receives the channel response frame since the non-destination receiving end continues to listen to the channels) on the sub-channels on which the channel request frame is transmitted in a duration of a short inter-frame space time (SIFS). If the channel response frame is received by the non-destination receiving end on the foregoing sub-channels within a packet control function inter-frame space (PIFS) (PIFS>SIFS), by the receiving end, it is determined that the sub-channels are busy, and NAVs (network allocation vector, which is used to indicate a duration during which the current channel is occurred by other station (STA)) of the sub-channels are set based on duration indication information in the channel response frame. If the channel response frame is not received by the non-destination receiving end on the foregoing sub-channels within the PIFS, it is determined that the NAVs of the sub-channels are not to be updated.

Figure 4:
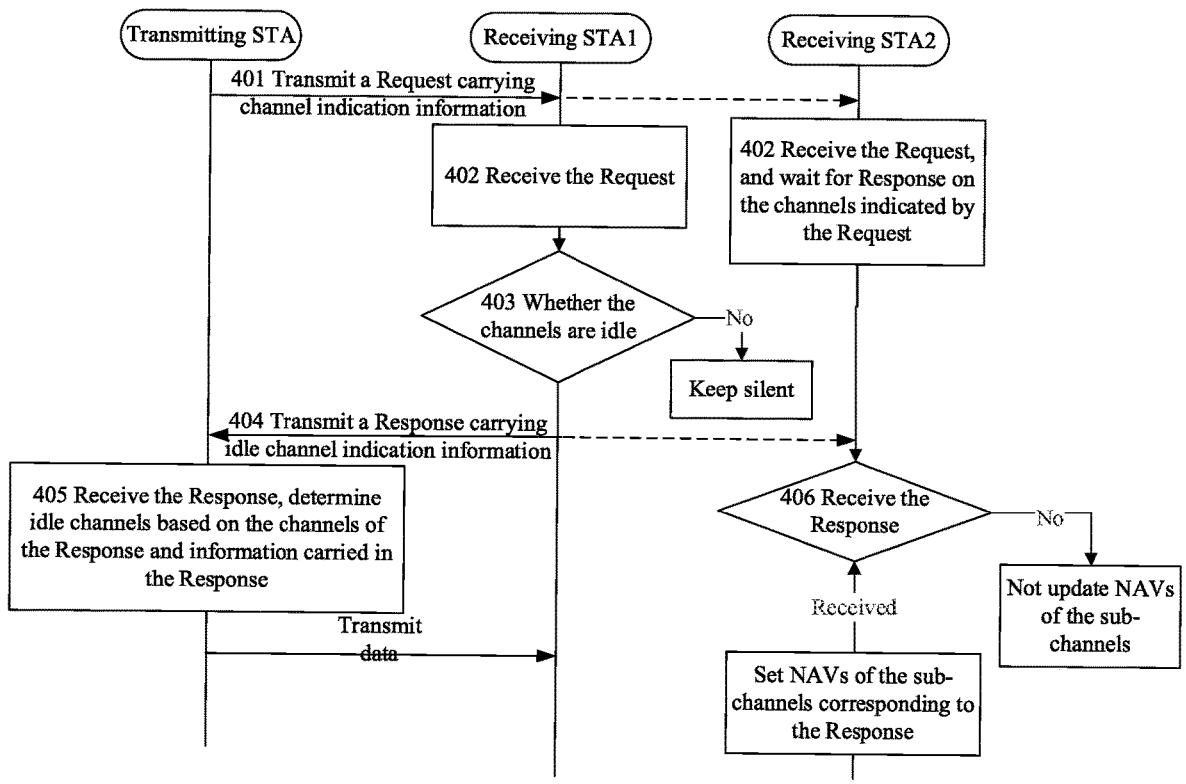
FIG. 4 is a schematic flowchart of a method according to an embodiment of the present invention.

All the foregoing steps may be expressed by the flowchart illustrated in FIG. 4, where STA1 is the transmitting end, STA2 is the destination receiving end, and STA3 is the non-destination receiving end.

To support the foregoing steps, the channel request frame and the channel response frame in FIG. 3 and FIG. 4 are required to carry channel indication information. A possible frame format is illustrated in Table 1. The channel request frame and the channel response frame may have a same format herein. In the frame format, frame control mainly indicates a type and a feature of a frame, duration is used to indicate a duration occupied by the frame or expected to be occupied by the transmitting end, RA (Receiver Address) represents an address of the destination receiving end, TA (transmitter Address) represents an address of the transmitting end, and Number of Channels represents the number of channels on which the frame is sent, Channel Info n represents information of an n-th channel which may includes a channel number or a central frequency of the channel, and frame check sequence (FCS) is used by the receiving end to check whether the frame is correctly received. Number of Channels and Channel Info 1 to n carry channel indication information, which may indicate channel indication information of the current request/response. The channel described herein is measured in basic channel units. In a typical example, the channel unit is 20 MHz.

TABLE 1

A format of the channel request frame and the channel response frame

| Frame Control | Duration | RA | TA | Number of Channels | Channel Info 1 | ... | Channel Info n | FCS |
|---|---|---|---|---|---|---|---|---|
| 2 | 2 | 6 | 6 | 1 | 1 | | 1 | 4 |

Reference is made to FIG. 4, which is a flowchart of determining multiple idle sub-channels and setting NAVs, including the following steps 401 to 406.

In 401, a transmitting STA transmits a Request carrying channel indication information on idle channels. Both a receiving STA1 and a receiving STA2 listens to the idle channels and both the receiving STA1 and the receiving STA3 receive the Request.

In 402, the receiving STA1 (a destination receiving end) receives the Request; and the receiving STA2 (a non-destination receiving end) receives the Request, and further waits for a Response on the channels indicated by the Request.

In 403, the receiving STA1 checks whether the channels indicated by the Request are idle, keeps silent if the channels are not idle and the process goes to 404 if the channels are idle.

In 404, the receiving STA1 determines to reply to the transmitting STA with a Response on the idle channels; the receiving STA1 transmits the Response carrying idle channel indication information. Since the receiving STA2 also listens to the channels on which the Response is transmitted, the Response is also received by the receiving STA2.

In 405, the transmitting STA receives the Response, determines the idle channels based on the channels of the Response and information carried in the Response, and transmits data on the idle channels.

In 406, the receiving end STA2 receives the Response on the channels indicated by the Request; sets NAVs of the sub-channels corresponding to the Response if the Response is received on the channels indicated by the Request, without updating the NAVs of the sub-channels if the Response is not received on the channels indicated by the Request.

Further, as shown in Table 2, an indication information bit may be added into the frame control to indicate presences of two channel indication fields: the number of channels and Channel Info 1 to n (channel information), so as to keep compatible with the existing frame format. Besides in the frame control field, the information bit may also appear in locations such as Duration/RA/TA, which is not limited by the embodiment of the present invention. In addition, the indication field of Number of Channels may also be omitted if the receiving end can effectively separate and obtain the number of the currently indicated channels. In order to further improve efficiency and reduce overhead of the frame format, the channel response frame transmitted by the receiving end after the channel request frame is received by the receiving end may use a bitmap to simplify the channel indication information.

TABLE 2

A simplified channel response frame

| Frame Control | Duration | RA | TA | Channel Bitmap | FCS |
|---|---|---|---|---|---|
| 2 | 2 | 6 | 6 | 1 | 4 |

As shown in Table 2, in a channel bitmap, the sub-channels indicated by the channel request frame transmitted by the transmitting end are indicated by means of a bitmap. For example, if four channels 1, 2, 3 and 6 are requested in the channel request frame, and the receiving end is idle on channels 1, 3 and 6, then the bitmap may be 10100100 or 10110000. The first indicating way is corresponding to physical locations of the channels, and the second indicating way is corresponding to logical locations of the channels, that is, the channels indicated by the channel request frame are indicated after being numbered in sequence, that is, channels 1, 2, 3 and 6 are numbered in sequence as 1, 2, 3, and 4, and are mapped to the first four bits of the bitmap. Whether the channels are available or unavailable is indicated by setting the first four bits of the bitmap to be 1 or 0 by the receiving end. It should be noted that, 1 may be used to represent that the channel is available and 0 may be used to represent that the channel is unavailable in the bitmap, which is not limited by the embodiment of the present invention. Similarly, in order to keep compatible with the existing format, the Channel bitmap of the channel response frame is optional, and an information bit which is located in front of the Channel bitmap is used to indicate whether the Channel bitmap exists.

Figure 5:
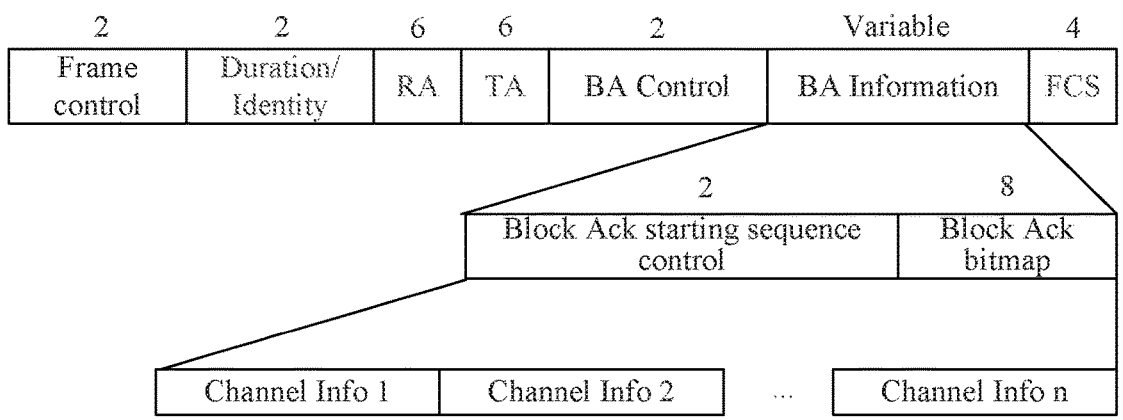
FIG. 5 is a schematic diagram of a format of a frame according to an embodiment of the present invention.

Besides the specifically designed channel request frame and channel response frame, if the transmitting end directly transmits data on the idle channels and indicates the channel indication information in the data, the channel indication information of the response may be carried in ACK/BA (Acknowledgement/Block Acknowledgement) by the receiving end. A possible format is illustrated in FIG. 5, where the channel indication information is added in BA. Although the format illustrated in FIG. 5 is a channel number or a central frequency of the channel, simplified bitmap information may also be carried, which is not limited by the present invention.

In FIG. 5, a frame control (Frame Control), a duration/identity (Duration/Identity, ID), a receiving end address (receiver address, RA), a transmitting end address (transmitter address, TA), a BA control, a BA information and a frame check sequence (FCS) are included. The BA information carries a Block acknowledgment starting sequence control (Block Ack Starting Sequence Control) and a Block Acknowledgement bitmap (Block Ack bitmap), and the Block Ack bitmap carries channel information (Channel Info) 1 to n, the number of occupied bytes are illustrated in each field.

Second Embodiment

Figure 6:
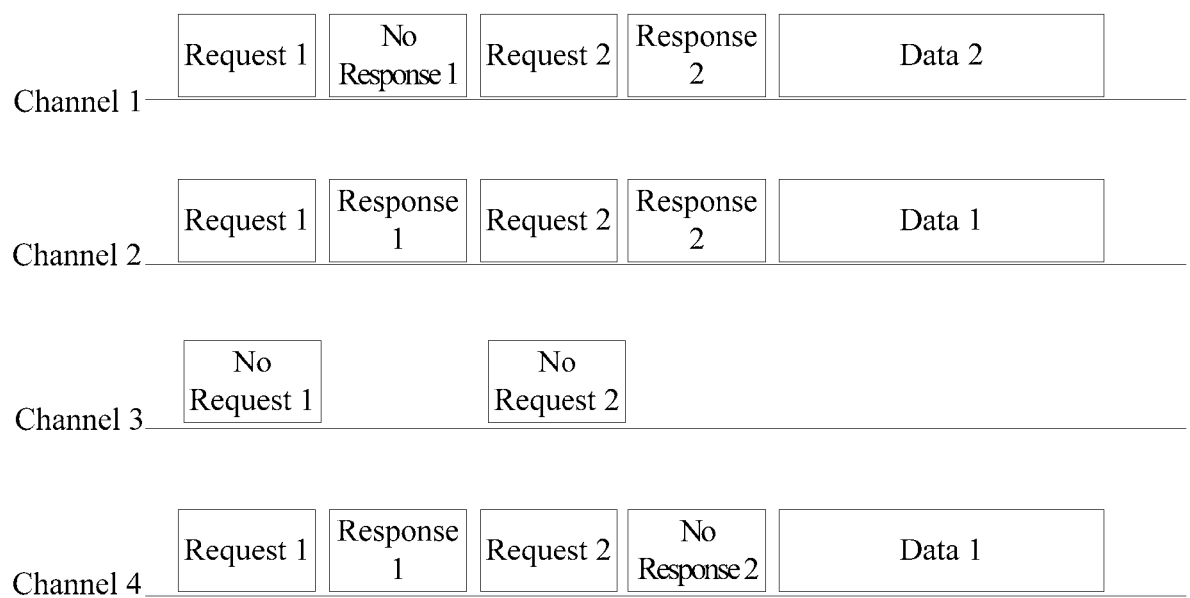
FIG. 6 is a schematic flowchart of determining idleness of channels in a case of multiple users according to an embodiment of the present invention.

On the basis of the first embodiment, the embodiment extends the mode to support multiple user transmission. FIG. 6 illustrates an example of orthogonal frequency division multiple access/frequency division multiplexing (OFDMA/FDMA). The transmitting mode may also be other modes such as orthogonal frequency division multiplexing (OFDM), and a mode of multiple user transmission, and so on, which is not limited by the embodiment of the present invention.

FIG. 6 is a schematic diagram of determining idleness of channels in a case of multiple users. The present invention is similar to the first embodiment in the process, and the extension of this embodiment lies in that, the transmitting end may transmit the channel request frame to multiple destination receiving ends by means of transmitting for multiple times (there is only one destination receiving end for each transmission), which includes the following steps 1 to 3.

In step 1, the transmitting end transmits a channel request frame (Request) to a receiving end on multiple sub-channels. The channel request frames are in a same format and carry channel indication information to indicate the channels on which the channel request frame is transmitted.

In step 2, upon receipt of the channel request frame on the sub-channels, the receiving end determines whether the receiving end itself is the destination receiving end for the channel request frame. If the receiving end is the destination receiving end for the channel request frame, the receiving end transmits a channel response frame by determining idleness states of the foregoing sub-channels, that is, the receiving end transmits the channel response frame if the channels are idle and does not transmit the channel response frame if the channels are busy. The channel response frames transmitted on the idle sub-channels may be in a same format and carry channel indication information to indicate the channels on which the channel response frame is transmitted.

In step 3, the transmitting end receives the channel response frame on the sub-channels on which the channel request frame is transmitted, determines whether currently the idle channels can be used adequately. If the idle channels are not used adequately, another receiving end is used and the process returns to step 1. If the idle channels can be used adequately, the transmitting end transmits data to the receiving end which is requested this time on the sub-channels on which the channel response frame is received by means of OFDMA/FDMA.

In the foregoing step 3, a criterion for determining whether the channels can be used adequately may be:

1. A ratio of a quantity of the sub-channels on which the channel response frame is received (which may be response sub-channels of multiple users and a union thereof is obtained) to a quantity of the sub-channels on which the channel request frame is transmitted by the transmitting end is greater than a predetermined threshold. It is assumed that the former is Nrsp, and the latter is Nreq, and then the ratio is Nrsp/Nreq; and it is assumed that the threshold is σ, and then the condition is expressed as Nrsp/Nreq>σ.

2. The sub-channels on which the channel response frame is received currently include a primary channel (primary channel, primary channel, used to transmit data frames, control frames and management frames). It is determined that the sub-channels are not used adequately if the sub-channels on which the channel response frame is received do not include a primary channel.

The foregoing two criteria 1 and 2 are in an OR relationship.

In the foregoing step 3, besides the manner of determining whether the channels are used adequately, multiple requests and responses may be performed by using the steps in the embodiment if multiple user transmission (such as OFDMA/FDMA) is to be used by the transmitting end itself, so as to fully learn the idleness states of the sub-channels of each receiving end.

In the foregoing step 3, in transmitting the data to the multiple destination receiving ends by the transmitting end by means of OFDMA/FDMA, the destination receiving ends selected by the transmitting end and the bandwidth allocated for each destination receiving end may be determined by the transmitting end. Implementations thereof are flexible, which are not limited by the embodiment of the present invention.

Figure 7:
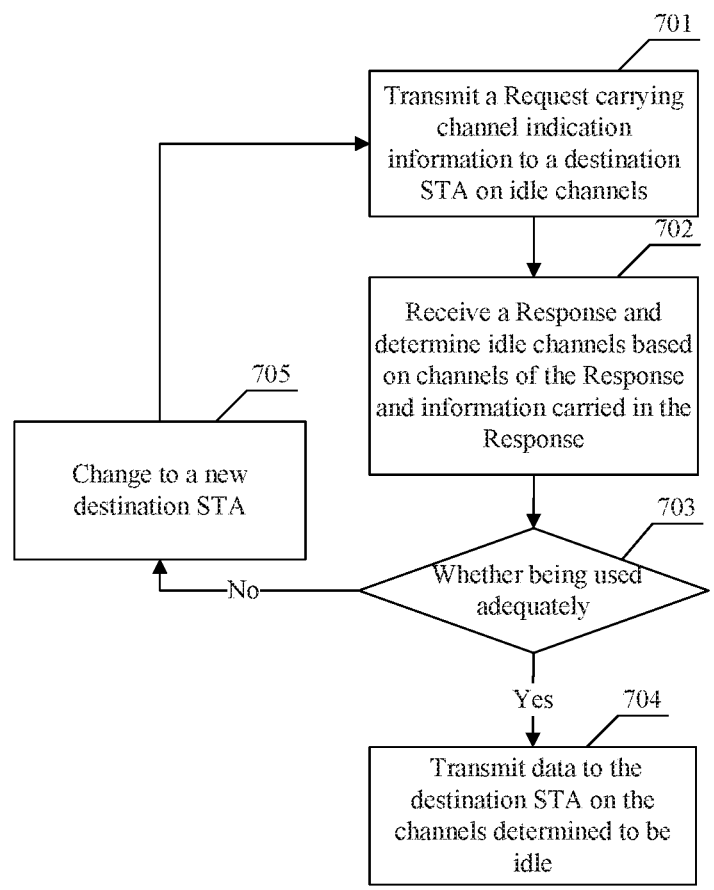
FIG. 7 is a schematic flowchart of a method according to an embodiment of the present invention.

The embodiment may be shown by a flowchart illustrated in FIG. 7, which is a schematic extended flowchart of a transmitting end transmitting on channels by means of OFDMA/FDMA, which includes the following steps 701 to 705.

In 701, a transmitting STA transmits a Request carrying channel indication information to a destination STA on idle channels.

In 702, the destination STA receives a Response, and determines idle channels based on channels of the Response and information carried in the Response.

In 703, the transmitting STA determines, based on the Response, the current idle channels and whether the current idle channels are used adequately. The process goes to 704 if the current idle channels are used adequately or the process goes to 705 if the currently idle channels are not used adequately.

In 704, the transmitting STA transmits data to the destination STA on the channels which are determined to be idle.

In 705, the transmitting STA changes to a new destination STA, and the process goes to 701.

Third Embodiment

In the embodiment, the solutions of the first embodiment and the second embodiment are applied to an overlapping basic service set (Overlapping OBSS) scenario, to further improve utilization efficiency of the network spectrum. The embodiment places emphasis on, a basic service set (BSS) further using an idle channel of a neighbor BSS to assist temporary transmission of a larger amount of data in the OBSS scenario.

Figure 8:
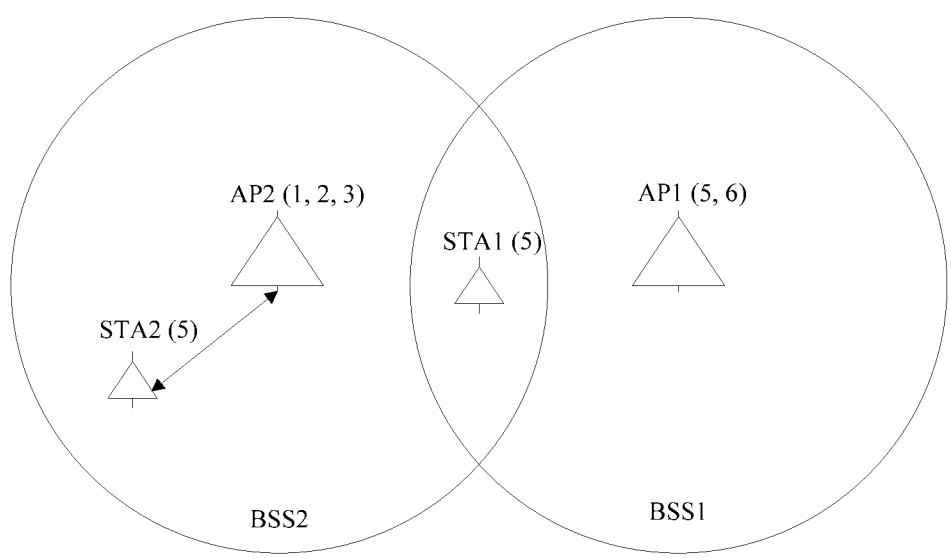
FIG. 8 is a schematic structural diagram of a network according to an embodiment of the present invention.

In a process of the embodiment, a sub-channel of another BSS (off channel) is used to assist data transmission. A simple scenario is used as an example. It is assumed that there are two BSSs, as shown in FIG. 8, which is a schematic diagram of utilizing an Off Channel in a case of two overlapping BSSs. Channels operated by BSS1 corresponding to access point 1 are channels 5 and 6, and channels operated by BSS2 corresponding to AP2 are channels 1, 2 and 3. If in BSS1, STA1 which is located in an overlapping region of BSS1 and BSS2 does not transmit a signal with AP1, and channel 5 is occupied by STA1, STA2 in BSS2 and AP2 may perform data transmission in this period by using the channel of BSS1, to support temporary transmission of a large amount of data.

The process of the embodiment is based on the first embodiment and the second embodiment. On this basis, a new process is needed by AP1 to ensure whether BSS1 can utilize a channel of another BSS (BSS2). In a case of uplink, that is, STA2 is a transmitting end and AP2 is a receiving end, step 3 remains unchanged. Step 1 and step 2 are described as follows:

In step 1, STA2 transmits a channel request frame (Request) to the receiving end on multiple sub-channels which include an off channel. The channel request frames transmitted on the multiple sub-channels are in a same format and carry channel indication information to indicate the channels on which the channel request frame is transmitted.

In step 2, upon receipt of the channel request frame on the sub-channels, AP2 determines whether AP2 is a destination receiving end for the channel request frame. If AP2 is the destination receiving end, AP2 transmits a channel response frame by determining idleness states of the sub-channels and whether the sub-channels are available (it is only determined whether the off channel is available and the determination is not performed on the channels of the BSS to which AP2 belongs, that is, the channels of BSS2), that is, AP2 transmits the channel response frame if the channels are idle and does not transmit the channel response frame if the channels are busy. The channel response frames transmitted on the idle sub-channels may be in a same format and carry channel indication information to indicate the channels on which the channel response frame is transmitted.

In step 3, STA2 receives the channel response frame on the sub-channels on which the channel request frame is transmitted, and determines whether currently the idle channels can be used adequately. If the idle channels are not used adequately, another AP is used and the process goes to step 1. If the idle channels can be used adequately, STA2 transmits data to the receiving end which is requested this time by means of OFDMA/FDMA on the sub-channels on which the channel response frame is received. The AP determines whether currently the idle channels can be used adequately, and if the idle channels are not used adequately, the AP also transmits the channel response frame on idle channels on which the channel request frame is not received, where destination addresses of these channel response frames are other possible STAs than STA2. This step is optional.

In step 4, STA2 transmits data to the receiving end which is requested this time by means of OFDMA/FDMA on the sub-channels on which the channel response frame is received. If the channel response frame whose destination addresses is the STA is received on another sub-channel by another STA, then the another STA transmits data with STA2 on the another sub-channel by means of OFDMA/FDMA.

Figure 9:
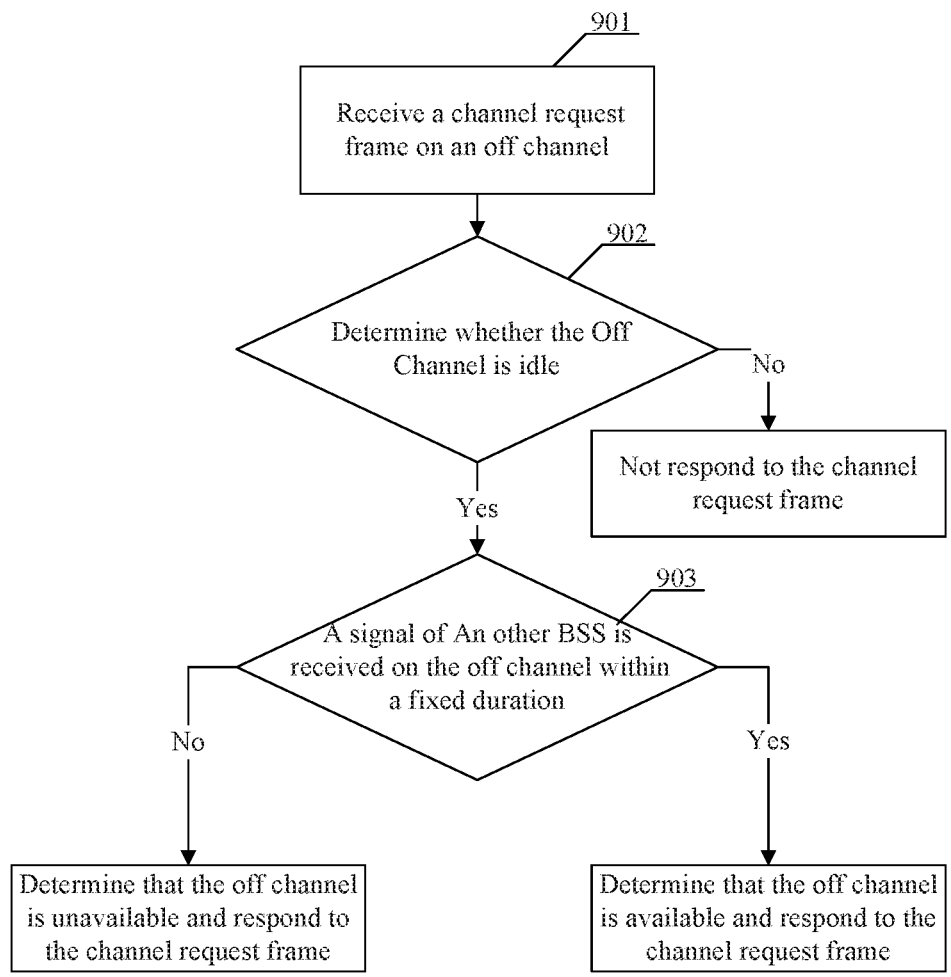
FIG. 9 is a schematic flowchart of a method according to an embodiment of the present invention.

For the idleness state of the sub-channel, off channel, in the step 2, a process illustrated in FIG. 9 is further performed by AP to further determine whether the off channel is available. "Receiving a signal of another BSS on the off channel within a duration" is a historical record at the AP, and the AP may determine, based on the record, whether a signal from another BSS is received within a duration indicated by the request frame of the STA. The determining criterion is only a possible determining criterion, and in practice there may be multiple determining criteria, such as determining based on interactive information with an adjacent AP. In this case, the AP collects buffer/queue information (even information such as contention window information and back off time information) of the STA in the local BSS, and interacts with an adjacent AP for the information. Based on the foregoing information of the neighbor AP, the AP may determine whether a signal from another BSS is received on the off channel within a duration indicated in the request frame of the STA. In an alternative method, the AP directly collects related information of the STA in the neighbor BSS (such as buffer/queue information, or information such as contention window information and back off time information) and makes a determination based on the information. Reference is made to FIG. 9, which illustrates a determination process if the AP receives a request on an off channel, which includes the following steps 901 to 903.

In 901, the AP receives a channel request frame on an off channel, that is, the channels on which the channel request frame is received include an off channel.

In 902, the AP determines whether the Off channel is idle. The process goes to 903 if the off channel is idle and the AP makes no response to the foregoing channel request frame if the off channel is not idle.

In 903, the AP determines whether a signal of another BSS is received on the off channel within a fixed duration. If a signal of another BSS is received on the off channel within a fixed duration, the AP determines that the off channel is unavailable and makes a response to the foregoing channel request frame. If a signal of another BSS is not received on the off channel within a fixed duration, the AP determines that the off channel is available and makes a response to the foregoing channel request frame.

The embodiment may also be applied to downlink transmission of the off channel. The process is basically the same as the foregoing process. It should be noted that, the subject for performing the determination is still the AP, and the STA is not responsible for the signal from the adjacent BSS.

In step 1, the AP determines whether the off channel is available.

In step 2, if the off channel is available, the AP transmits a channel request frame (Request) to the STA on multiple sub-channels which include the off channel. All the transmitted channel request frames may be in a same format and carry channel indication information to indicate the channels on which the channel request frame is transmitted at this time.

In step 3, upon receipt of the channel request frame on the sub-channels, the STA firstly determines whether the STA itself is a destination receiving end for the channel request frame. If the STA is the destination receiving end, the STA transmits a channel response frame by determining idleness state of the STA on the foregoing sub-channels, that is, the STA transmits the channel response frame if the channels are idle and does not transmit the channel response frame if the channels are busy. All the channel response frames transmitted on the idle sub-channels may be in a same format and carry channel indication information to indicate the channels on which the channel response frame is transmitted.

In step 4, the AP receives the channel response frame on the sub-channels on which the channel request frame is transmitted, and determines whether currently the idle channels can be used adequately. If the idle channels are not used adequately, another STA is used and the process goes to step 1. If the idle channels can be used adequately, the AP transmits data to the STA which is requested this time by means of OFDMA/FDMA on the sub-channels on which the channel response frame is received.

Fourth Embodiment

In the embodiment, the solutions of the first embodiment and the second embodiment are applied to an OBSS scenario, to further improve utilization efficiency of the network spectrum. The embodiment places emphasis on, a BSS further using an idle channel of the BSS itself in the OBSS scenario.

Figure 10:
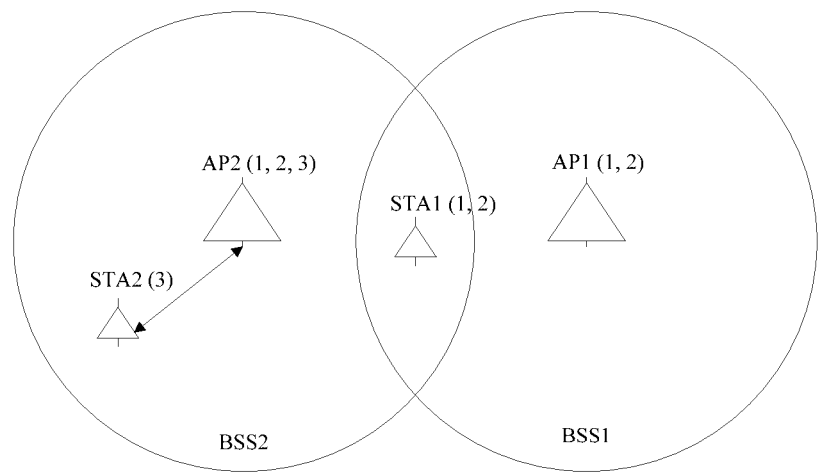
FIG. 10 is a schematic structural diagram of a network according to an embodiment of the present invention.

Reference is made to FIG. 10, which is a schematic structural diagram of a network in which extra channels are utilized in a case of two overlapping BSSs. As shown in FIG. 10 in the embodiment, a scenario with two APs is still used as an example: Channels operated by BSS1 are channels 1 and 2, and channels operated by BSS2 are channels 1, 2 and 3. If in BSS1, STA1 which is located in an overlapping region of BSS1 and BSS2 transmits a signal with AP1 on channels 1 and 2 or AP1 transmits a signal on channels 1 and 2, AP2 cannot communicate with STA2 in BSS2 on channels 1 and 2. However, in this case, AP2 may communicate with STA2 in BSS2 by utilizing channel 3, to increase data transmission time in BSS2 and improve a throughput of the network.

Figure 11:
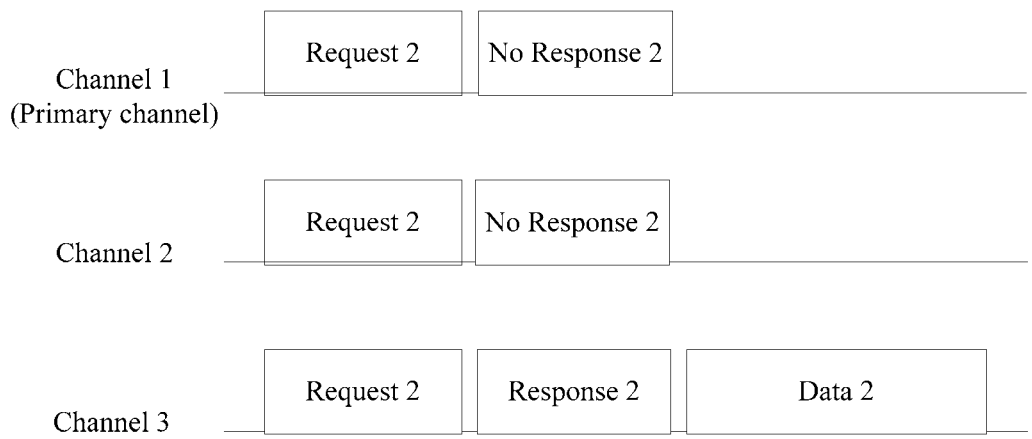
FIG. 11 is a schematic flowchart of determining idleness in a case in which there is a primary channel according to an embodiment of the present invention.

The process of channel request and response in the embodiment (steps 1, 2 and 3) is similar to that of the first embodiment (a single user) or that of the second embodiment (multiple users). In order to realize the objective of the embodiment, if currently a primary channel is unavailable but sub-channels are available, the AP needs to determine whether there is a legacy STA in the BSS currently, and there are two situations as follows:

One, if AP2 is a receiving end, the channel request frame of the transmitting end is not responded to on any of the sub-channels if currently there is a legacy STA in BSS2, and the channel request frame of the transmitting end is responded to on only idle sub-channels (which do not include the primary channel) if currently there is no legacy STA in the BSS. For the scenario illustrated in FIG. 10, FIG. 11 illustrates a schematic flowchart in which a STA transmits a request and an AP makes a response. Three channels, channel 1, channel 2 and channel 3 are included. Channel 1 is a primary channel. STA2 transmits a channel request frame (RTS2). AP2 does not transmit a channel response frame (there is no channel response frame) on channel 1 and channel 2, and AP2 transmits a channel response frame on channel 3.

Two, if AP2 is a transmitting end, the channel request frame is transmitted on all sub-channels if currently there is a legacy STA in BSS2 and the channel request frame is transmitted on only idle sub-channels (which do not include a primary channel) if currently there is no legacy STA in BSS2.

Figure 12:
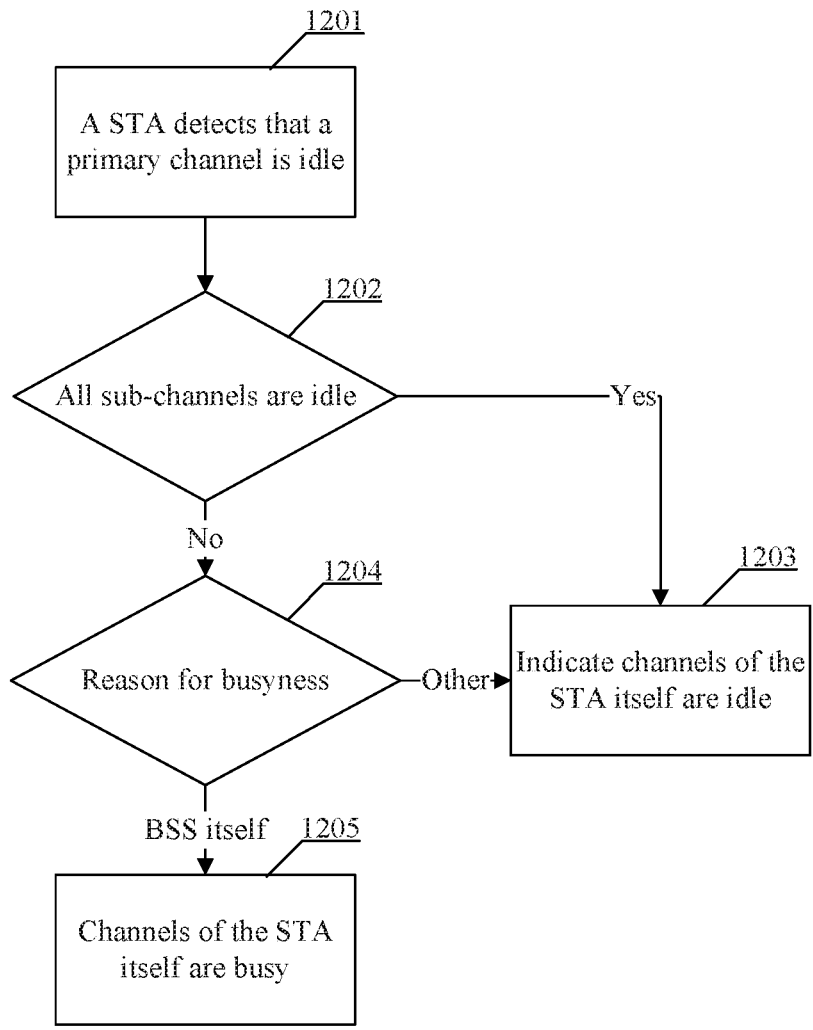
FIG. 12 is a schematic flowchart of a method according to an embodiment of the present invention.

Further, for a STA of a new generation, a process of determining whether channels are idle by the STA is illustrated in FIG. 12. A main objective of the process is to keep other STAs from finding that, the AP initiates an all-channel transmission when the primary channel is idle, which will cause failure of secondary channel transmission being performed between the AP and the STA. The process includes the following steps 1201 to 1205.

In 1201, a STA detects that the primary channel is idle, and the process goes to step 1202.

In 1202, it is determined whether all sub-channels of the local BSS are idle. The process goes to step 1203 if all the sub-channels are idle, and the process goes to 1204 if not all the sub-channels are idle.

In 1203, if all the sub-channels of the local BSS are idle, it is indicated that the channels of the STA itself are idle, a back off process may continue, and a signal is transmitted.

In 1204, if some sub-channels of the BSS itself are busy, it is further determined whether busyness of the some sub-channels is caused by data transmission in the local BSS or caused by data transmission in other BSS. If the busyness is caused by data transmission in other BSS, the process goes to step 1203. If the busyness is caused by data transmission in the local BSS, the process goes to step 1205.

In 1205, it is indicated that channels of the STA itself are busy, the back off process is kept suspended, and no signal is transmitted.

The back off process corresponding to the foregoing steps is based on whether the indicated channels of the STA are idle or busy. If a signal of the local BSS is detected in any of the sub-channels of the BSS, it is determined that the current channels are busy. Different from the NAVs of the multiple sub-channels in the first embodiment, the NAV of each sub-channel only indicates whether the sub-channel is idle or busy; and there is only one to determine whether the channel is idle or busy in the back off process of the STA. Further, in the process illustrated in FIG. 12, the STA is required to determine whether the busyness of the sub-channels is caused by a signal of the local BSS or caused by a signal of other BSS, hence the STA is required to store a transmitting end address corresponding to the NAV. The transmitting end address may be a MAC address or an associate address (Associate Identifier, AID).

In another possible back off process, the STA or the AP only operates on the primary channel, that is, a back off timer starts to decrease when the primary is idle. In this case, in order to better implement the solution of the embodiment, the STA may initiate transmission on a secondary channel if it is detected that the secondary channel is idle, when the back off timer is not decreased to zero. The transmitting duration on the "secondary channels" is determined based on the value of the NAV of the primary channel (for example, the transmitting duration of a neighbor BSS on the primary channel is known). In order to avoid that multiple STAs initiate transmission on a same secondary channel, each STA is required to have a second back off, and the second back off starts to operate only if the original back off (the first back off) is suspended and the secondary channel is idle. The specific working process is same as that of the first back off.

Further, the solution of the embodiment of the present invention may be applied to a BSS which operates in a full frequency band (that is, there is no BSS channel and each BSS occupies all available sub-channels; transmission may be initiated once an idle sub-channel is detected). In this case, each BSS is required to have a primary channel, and frequency bands of primary channels of neighbor BSSs are staggered (not overlapping) as much as possible.

Figure 13:
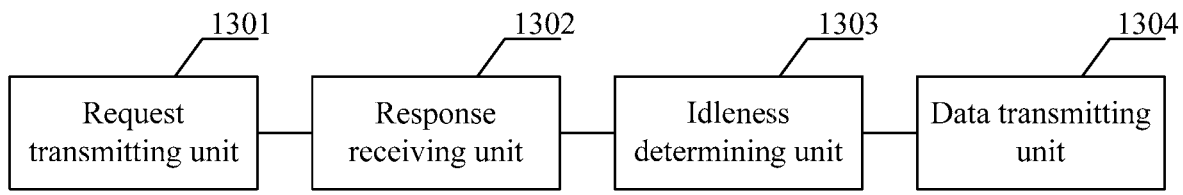
FIG. 13 is a schematic structural diagram of a data transmission device according to an embodiment of the present invention.

As shown in FIG. 13, a data transmission device is provided according to an embodiment of the present invention, which includes:

a request transmitting unit 1301, configured as a transmitting end to transmit a channel request frame to a first receiving end on at least two sub-channels;

a response receiving unit 1302, configured to receive a channel response frame from the first receiving end after the channel request frame is transmitted by the request transmitting unit 1301;

an idleness determining unit 1303, configured to parse the channel response frame to obtain second channel indication information after the channel response frame from the first receiving end is received by the response receiving unit 1302, where the second channel indication information indicates a sub-channel on which the channel response frame is transmitted; and determine that the sub-channel on which the channel response frame is transmitted is idle; and a data transmitting unit 1304, configured to transmit data to the first receiving end on the sub-channel that is determined to be idle by the idleness determining unit 1303.

In the embodiment of the present invention, a channel response frame from a receiving end carries second channel indication information, and the second channel indication information may indicate a sub-channel on which the channel response frame is transmitted. In this way, the transmitting end can learn on which sub-channels the channel response frame is transmitted and determine that the sub-channels are idle, without being limited to continuous bandwidth combinations indicated by 3 bits. Therefore, restriction of a location relationship of frequency bands can be overcome, and all combinations of various sub-channels can be indicated.

Specifically, the sub-channel on which the channel response frame is transmitted, indicated by the second channel indication information obtained by parsing by the idleness determining unit 1303, is not continuous. The solution in the background can only use continuous idle frequency bands, which wastes frequency band resources. Specifically, in the example in the background, channel 4 is wasted, so that utilization efficiency of the frequency band resources in the technical solution of the background is low. In the embodiment, the idle sub-channels corresponding to the channel response frame received by the transmitting end are not continuous, that is, the channel response frame is received by the transmitting end on discrete sub-channels, therefore the transmitting end can accurately determine whether the sub-channels are idle and then transmit data on idle sub-channels in a discrete manner, thereby avoiding the waste of channel resources and improving the utilization efficiency of the frequency band resources.

Optionally, the channel request frame transmitted by the request transmitting unit 1301 further carries first channel indication information, and the first channel indication information indicates the sub-channels on which the channel request frame is transmitted.

In the embodiment, by indicating, in the channel response frame, the sub-channel on which the channel response frame is transmitted, the receiving end can obtain more reliable information. Even if the response frame is not received on some sub-channels, the receiving end can still learn, from the information, whether the response frame is transmitted on the some sub-channels by the transmitting end.

Figure 14:
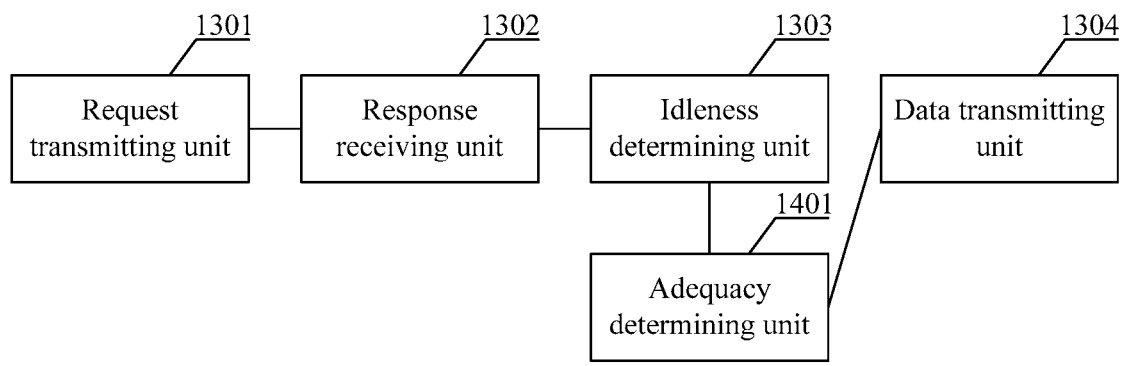
FIG. 14 is a schematic structural diagram of a data transmission device according to an embodiment of the present invention.

Further, an embodiment of the present invention further provides an implementation solution for channel determination before the data is transmitted as follows: As shown in FIG. 14, the foregoing data transmission device further includes:

an adequacy determining unit 1401, configured to determine whether the sub-channels which are idle determined by the idleness determining unit 1303 can be used adequately; and the request transmitting unit 1301 is further configured to transmit the channel request frame to a second receiving end on the at least two sub-channels if the adequacy determining unit 1401 determines that the idle sub-channels cannot be used adequately; and the data transmitting unit 1304 is configured to transmit the data to the first receiving end on the idle sub-channels in an orthogonal frequency division multiplexing, orthogonal frequency division multiple access or frequency division multiplexing manner if the adequacy determining unit 1401 determines that the sub-channels which are idle can be used adequately.

Optionally, an embodiment of the present invention further provides a process of determining whether the current idle sub-channel can be used adequately. Specifically, the adequacy determining unit 1401 is configured to determine whether a ratio of a quantity of the idle sub-channel to a quantity of the sub-channels on which the channel request frame is transmitted is greater than a predetermined threshold; and determine that the idle sub-channels are not used adequately if the ratio is greater than the predetermined threshold, and determine that the idle sub-channels can be used adequately if the ratio is not greater than the predetermined threshold. Alternatively, the adequacy determining unit 1401 is configured to determine whether the idle sub-channels include a primary channel, and determine that the idle sub-channels are not used adequately if the idle sub-channels do not include the primary channel.

Optionally, the data transmission device is in a first basic service set; and the at least two sub-channels on which the channel request frame is transmitted by the request transmitting unit 1301 include a sub-channel of a second basic service set.

Figure 15:
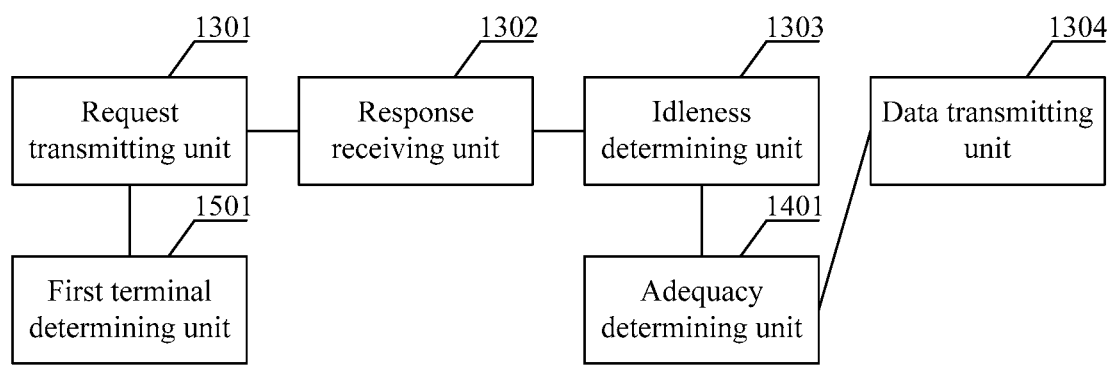
FIG. 15 is a schematic structural diagram of a data transmission device according to an embodiment of the present invention.

Optionally, an embodiment of the present invention further provides a case of applying the solution of the embodiment of the present invention to an OBSS scenario, to further improve utilization efficiency of the network spectrum. The embodiment places emphasis on, a BSS further using an idle channel of the BSS itself in the OBSS scenario. Specifically, if the data transmission device is an access point of a basic service set, as shown in FIG. 15, the data transmission device further includes:

a first terminal determining unit 1501, configured to determine whether the basic service set to which the access point belongs includes a specific terminal acting as a receiving end; and the request transmitting unit 1301 is configured to transmit the channel request frame on all sub-channels of the basic service set to which the access point belongs if the first terminal determining unit 1501 determines that the basic service set to which the access point belongs includes a specific terminal acting as a receiving end; and transmit the channel request frame on an idle sub-channel, in the basic service set to which the access point belongs, that does not include a primary channel, if the first terminal determining unit 1501 determines that the basic service set to which the access point belongs does not include a specific terminal acting as a receiving end.

Further, an embodiment of the present invention further provides another solution to determine whether the sub-channels are idle in a scenario with a primary channel. Specifically, the idleness determining unit 1303 is further configured to, if it is determined based on the channel response frame that the primary channel of the basic service set is idle, and the basic service set includes a busy sub-channel, determine whether busyness of the busy sub-channel is caused by data transmission in the basic service set, and determine that the busy sub-channel is an idle sub-channel if the busyness of the busy sub-channel is not caused by data transmission in the basic service set.

In the embodiment, a back off process may be performed after it is determined that the sub-channels are idle, and the back off process needs to be suspended if it is determined that the sub-channels are not idle.

Figure 16:
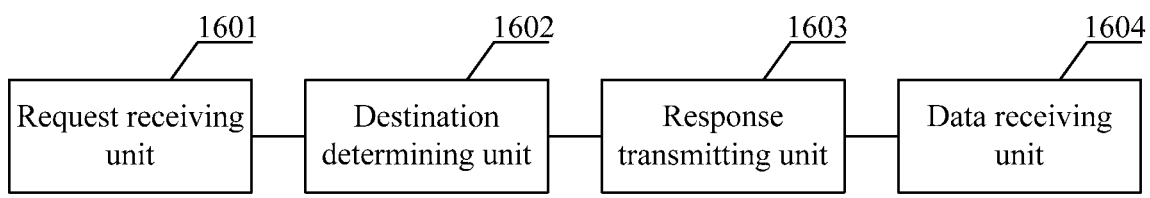
FIG. 16 is a schematic structural diagram of a data transmission device according to an embodiment of the present invention.

As shown in FIG. 16, another data transmission device is provided according to an embodiment of the present invention, which includes:

a request receiving unit 1601, configured as a first receiving end to receive a channel request frame from a transmitting end;

a destination determining unit 1602, configured to determine whether the data transmission device is a destination receiving end for the channel request frame after the channel request frame from the transmitting end is received by the request receiving unit 1601;

a response transmitting unit 1603, configured to, if the destination determining unit 1602 determines that the data transmission device is the destination receiving end for the channel request frame, and a sub-channel corresponding to the request frame is idle, transmit a channel response frame to the transmitting end on the sub-channel that is idle, where the channel response frame carries second channel indication information and the second channel indication information indicates the sub-channel on which the channel response frame is transmitted; and a data receiving unit 1604, configured to receive data from the transmitting end on the sub-channel on which the channel response frame is transmitted by the response transmitting unit.

In the embodiment of the present invention, a channel response frame transmitted from a receiving end carries second channel indication information and the second channel indication information may flexibly indicate a sub-channel on which the channel response frame is transmitted. In this way, the transmitting end can learn on which sub-channels the channel response frame is transmitted and determine that the sub-channels are idle, without being limited to continuous bandwidth combinations indicated by 3 bits. Therefore, restriction of a location relationship of frequency bands can be overcome, and all combinations of various sub-channels can be indicated.

Specifically, the sub-channel on which the channel response frame is transmitted by the response transmitting unit 1603 is not continuous. Based on the description in the background, the solution in the background can only use continuous idle frequency bands, which wastes frequency band resources. Specifically, in the example in the background, channel 4 is wasted, so that utilization efficiency of the frequency band resources in the technical solution of the background is low. In the embodiment, the idle sub-channels corresponding to the channel response frame received by the transmitting end are not continuous, that is, the channel response frame is received by the transmitting end on discrete sub-channels, therefore the transmitting end can accurately determine whether the sub-channels are idle and then transmit data on idle sub-channels in a discrete manner, thereby avoiding the waste of channel resources and improving the utilization efficiency of the frequency band resources.

Figure 17:
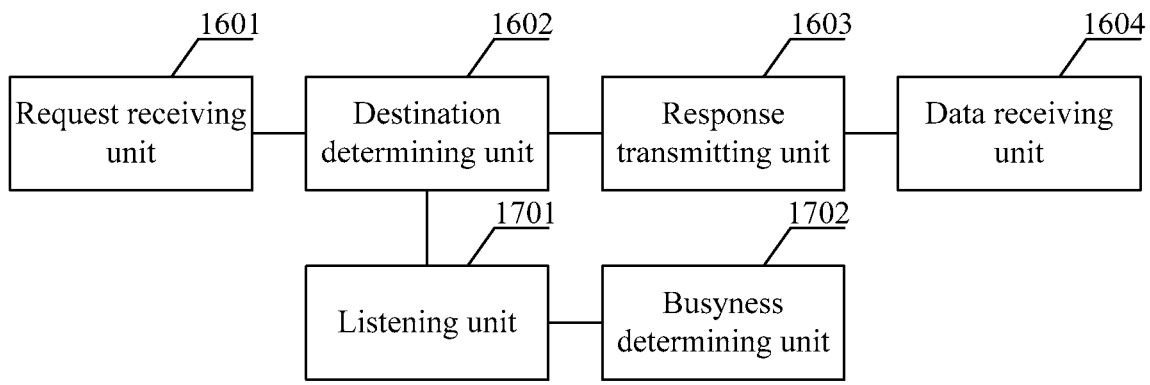
FIG. 17 is a schematic structural diagram of a data transmission device according to an embodiment of the present invention.

Further, an embodiment of the present invention further provides a solution for a situation in which the data transmission device receiving the request frame is not a destination receiving end for the request frame as follows: As shown in FIG. 17, the foregoing data transmission device further includes:

a listening unit 1701, configured to receive a channel response frame from a destination receiving end for the channel request frame after a duration of a short inter-frame space, by listening to the sub-channel corresponding to the channel request frame, if the destination determining unit 1602 determines that the first receiving end is not the destination receiving end for the channel request frame; and a busyness determining unit 1702, configured to determine that the sub-channel corresponding to the channel request frame is busy, if the channel response frame from the destination receiving end for the channel request frame is received by the listening unit 1701 within a packet control function inter-frame space.

Figure 18:
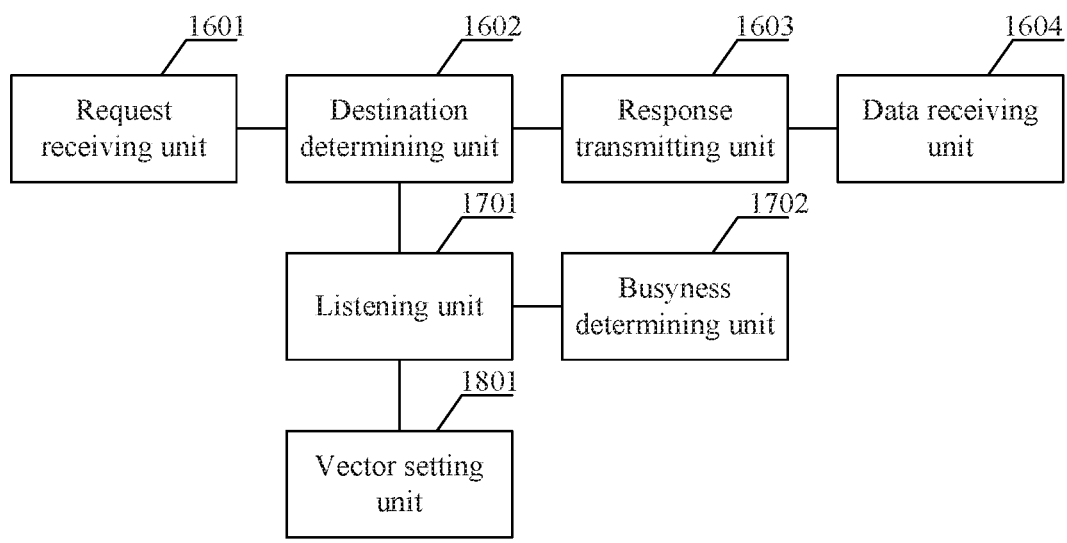
FIG. 18 is a schematic structural diagram of a data transmission device according to an embodiment of the present invention.

Further, an embodiment of the present invention further provides a solution to update a network allocation vector. Specifically, as shown in FIG. 18, the foregoing data transmission device further includes:

a vector setting unit 1801, configured to set a network allocation vector of the sub-channel corresponding to the channel request frame based on duration indication information in the channel response frame received by the listening unit 1701; and determine that the network allocation vector of the sub-channel corresponding to the channel request frame does not need to be updated if the channel response frame from the destination receiving end for the channel request frame is not received by the listening unit 1701 within the packet control function inter-frame space.

Figure 19:
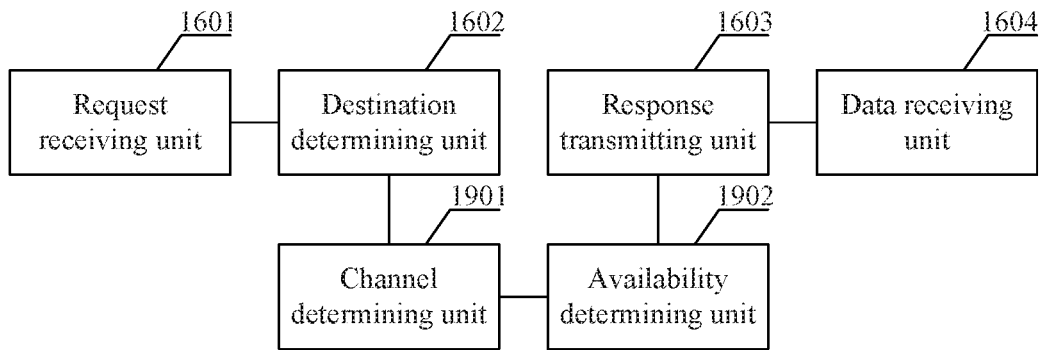
FIG. 19 is a schematic structural diagram of a data transmission device according to an embodiment of the present invention.

Further, an embodiment of the present invention further provides a case of applying the solution of the embodiment of the present invention to an overlapping basic service set (OBSS) scenario, to further improve utilization efficiency of the network spectrum. The embodiment places emphasis on, a basic service set (BSS) further using an idle channel of a neighbor BSS to assist temporary transmission of a larger amount of data in the OBSS scenario. Specifically, as shown in FIG. 19, the foregoing data transmission device further includes:

a channel determining unit 1901, configured to determine whether the sub-channel corresponding to the channel request frame is a sub-channel of a second basic service set, where a first basic service set is a basic service set to which the first receiving end belongs; and an availability determining unit 1902, configured to determine whether the sub-channel corresponding to the channel request frame is available if the channel determining unit 1901 determines that the sub-channel corresponding to the channel request frame is a sub-channel of the second basic service set; and the response transmitting unit 1603 is configured to transmit the channel response frame to the transmitting end if the availability determining unit 1902 determines that the sub-channel corresponding to the channel request frame is available.

Optionally, an embodiment of the present invention further provides a solution to determine whether the sub-channel is available. Specifically, the availability determining unit 1902 is configured to determine that the sub-channel corresponding to the channel request frame is available if it is determined that a signal of the second basic service set is not received on the sub-channel corresponding to the channel request frame within a predetermined duration; or determine whether the sub-channel corresponding to the channel request frame are available in a duration requested by the channel request frame, based on a communication state of the second basic service set.

Optionally, an embodiment of the present invention provides an optional solution for the communication state. Specifically, a communication record used by the availability determining unit 1902 to determine whether the sub-channels are available includes: at least one of terminal cache information, queue information, contention window information, or back off time information of the second basic service set.

Figure 20A:
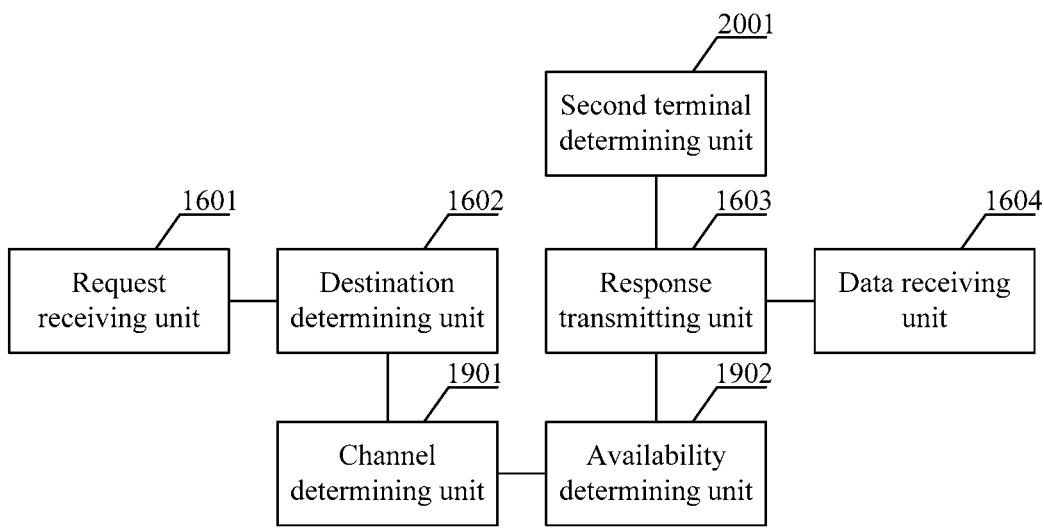
FIG. 20A is a schematic structural diagram of a data transmission device according to an embodiment of the present invention.

Further, an embodiment of the present invention further provides a case of applying the solution of the embodiment of the present invention to an OBSS scenario, to further improve utilization efficiency of the network spectrum. The embodiment places emphasis on, a BSS further using an idle channel of the BSS itself in the OBSS scenario. Specifically, if the data transmission device is an access point of a basic service set, as shown in FIG. 20A, the data transmission device further includes:

a second terminal determining unit 2001, configured to determine whether the basic service set to which the access point belongs includes a specific terminal acting as a receiving end; and the response transmitting unit 1603 is configured to skip transmitting the channel response frame on any of sub-channels if the second terminal determining unit 2001 determines that the basic service set to which the access point belongs includes a specific terminal acting as a receiving end; or transmit the channel response frame on an idle sub-channel, in the basic service set to which the access point belongs, that does not include a primary channel, if the second terminal determining unit 2001 determines that the basic service set to which the access point belongs does not include a specific terminal acting as a receiving end.

The foregoing specific terminal refers to a terminal that does not use or does not support the process of the method illustrated in FIG. 1.

Figure 20B:
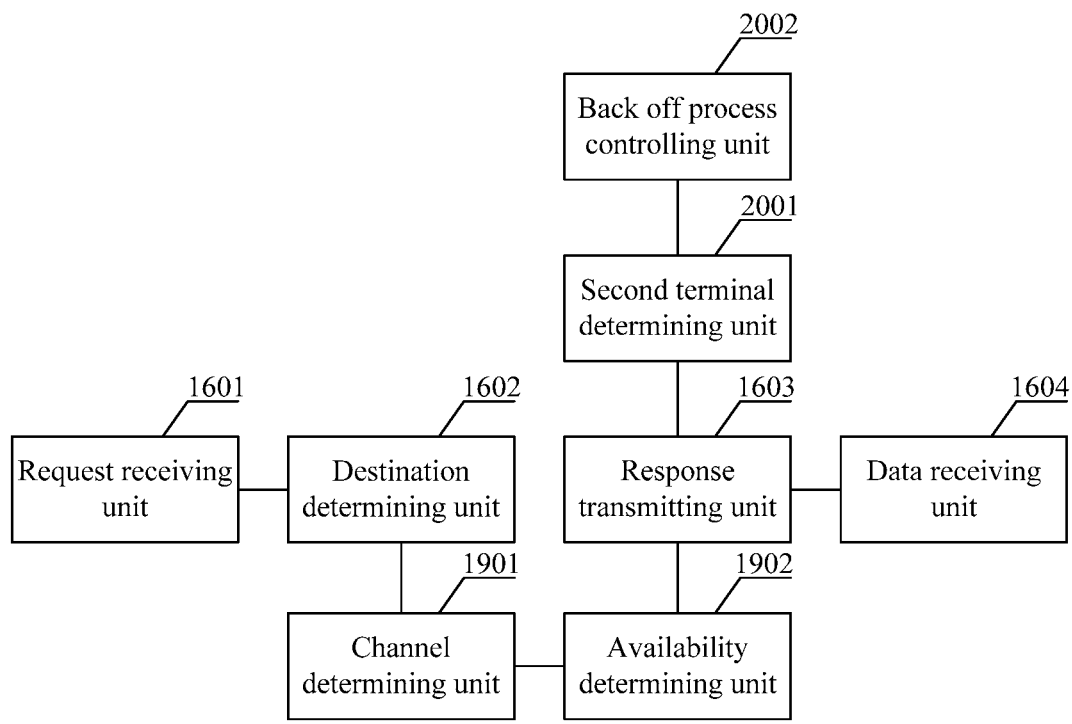
FIG. 20B is a schematic structural diagram of a data transmission device according to an embodiment of the present invention.

Further, as shown in FIG. 20B, an embodiment of the present invention further provides a solution to control a back off process as follows: The foregoing data transmission device further includes:

a back off process controlling unit 2002, configured to indicate channel idleness and that a back off process is to be continued, if the primary channel and all sub-channels are idle; or indicate channel busyness and keep suspending a back off process if the primary channel is idle, a part of sub-channels in the basic service set to which the access point belongs are busy and busyness of the part of sub-channels is caused by data transmission in the basic service set.

Figure 21:
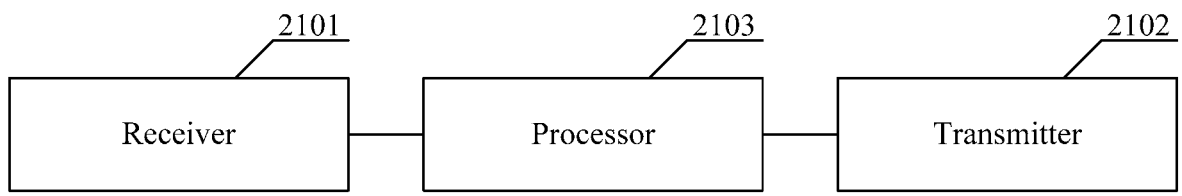
FIG. 21 is a schematic structural diagram of a data transmission device according to an embodiment of the present invention.

Another apparatus for data transmission is further provided according to an embodiment of the present invention. The apparatus for data transmission is used as a transmitting end of data. As shown in FIG. 21, the apparatus includes: a receiver 2101, a transmitter 2102 and a processor 2103.

The transmitter 2102 is configured to transmit a channel request frame to a first receiving end on at least two sub-channels, and transmit data to the first receiving end on sub-channels which are determined to be idle by the processor 2103.

The receiver 2101 is configured to receive a channel response frame from the first receiving end.

The processor 2103 is configured to parse the channel response frame to obtain second channel indication information after the channel response frame from the first receiving end is received by the receiver 2101, where the second channel indication information indicates a sub-channel on which the channel response frame is transmitted; and determine that the sub-channel on which the channel response frame is transmitted is idle.

In the embodiment of the present invention, a channel response frame from a receiving end carries second channel indication information, and the second channel indication information may indicate a sub-channel on which the channel response frame is transmitted. In this way, the transmitting end can learn on which sub-channels the channel response frame is transmitted and determine that the sub-channels are idle, without being limited to continuous bandwidth combinations indicated by 3 bits. Therefore, restriction of a location relationship of frequency bands can be overcome, and all combinations of various sub-channels can be indicated.

Further, the channel request frame further carries first channel indication information, and the first channel indication information indicates the sub-channels on which the channel request frame is transmitted.

By using the first channel indication information to indicate the sub-channels on which the channel request frame is transmitted, the receiving end can obtain more reliable information. Even if the channel request frame is not received on some sub-channels, the receiving end can still learn, from the information, the channels on which the channel request frame is transmitted by the transmitting end.

Specifically, the sub-channels on which the channel response frame is transmitted, indicated by the second channel indication information determined by the processor 2103, are not continuous. Based on the description in the background, the solution in the background can only use continuous idle frequency bands, which wastes frequency band resources. Specifically, in the example in the background, channel 4 is wasted, so that utilization efficiency of the frequency band resources in the technical solution of the background is low. In the embodiment, the idle sub-channels corresponding to the channel response frame received by the transmitting end are not continuous, that is, the channel response frame is received by the transmitting end on discrete sub-channels, therefore the transmitting end can accurately determine whether the sub-channels are idle and then transmit data on idle sub-channels in a discrete manner, thereby avoiding the waste of channel resources and improving the utilization efficiency of the frequency band resources.

Further, an embodiment of the present invention further provides an implementation solution for channel determination before the data is transmitted as follows: The processor 2103 is further configure to determine whether the determined idle sub-channel can be used adequately before data is transmitted to the first receiving end on the idle sub-channels; instruct the transmitter 2102 to transmit the channel request frame to a second receiving end on the at least two sub-channels if the idle sub-channel cannot be used adequately; and instruct the transmitter 2102 to transmit data to the first receiving end on the idle sub-channel in an orthogonal frequency division multiplexing, orthogonal frequency division multiple access or frequency division multiplexing manner if the idle sub-channel can be used adequately.

Optionally, an embodiment of the present invention further provides a process of determining whether the current idle sub-channel can be used adequately as follows: The processor 2103, for determining whether the idle sub-channel can be used adequately, is configured to determine whether a ratio of a quantity of the idle sub-channel to a quantity of the sub-channels on which the channel request frame is transmitted is greater than a predetermined threshold; determine that the idle sub-channels are not used adequately if the ratio is greater than the predetermined threshold, and determine that the idle sub-channels can be used adequately if the ratio is not greater than the predetermined threshold. Alternatively, the processor 2103 is configured to determine whether the idle sub-channels include a primary channel, and determine that the idle sub-channels are not used adequately if the idle sub-channels do not include the primary channel.

Optionally, an embodiment of the present invention further provides a case of applying the solution of the embodiment of the present invention to an overlapping basic service set (OBSS) scenario, to further improve utilization efficiency of the network spectrum. The embodiment places emphasis on, a basic service set (BSS) further using an idle channel of a neighbor BSS to assist temporary transmission of a larger amount of data in the OBSS scenario. Specifically, the apparatus for data transmission is in a first basic service set, and the at least two sub-channels in the sub-channels on which the transmitter 2102 transmits include a sub-channel of a second basic service set.

Optionally, an embodiment of the present invention further provides a case of applying the solution of the embodiment of the present invention to an OBSS scenario, to further improve utilization efficiency of the network spectrum. The embodiment places emphasis on, a BSS further using an idle channel of the BSS itself in the OBSS scenario. Specifically, if the foregoing transmitting end is an access point of a basic service set, the processor 2103 is further configured to determine whether the basic service set to which the access point belongs includes a specific terminal acting as a receiving end; instruct the transmitter 2012 to transmit the channel request frame on all sub-channels of the basic service set if the basic service set to which the access point belongs includes a specific terminal acting as a receiving end; and instruct the transmitter 2012 to transmit the channel request frame on an idle sub-channel, in the basic service set, that does not include a primary channel, if the basic service set to which the access point belongs does not include a specific terminal acting as a receiving end.

The foregoing specific terminal refers to a terminal that does not use or does not support the process of the method illustrated in FIG. 1.

Optionally, an embodiment of the present invention further provides another solution to determine whether the sub-channels are idle in a scenario with a primary channel. Specifically, the processor 2103 is further configured to, if it is determined based on the channel response frame that the primary channel of the basic service set is idle, and the basic service set includes a busy sub-channel, determine whether busyness of the busy sub-channel is caused by data transmission in the basic service set, and determine that the busy sub-channel is an idle sub-channel if the busyness of the busy sub-channel is not caused by data transmission in the basic service set.

Figure 22:
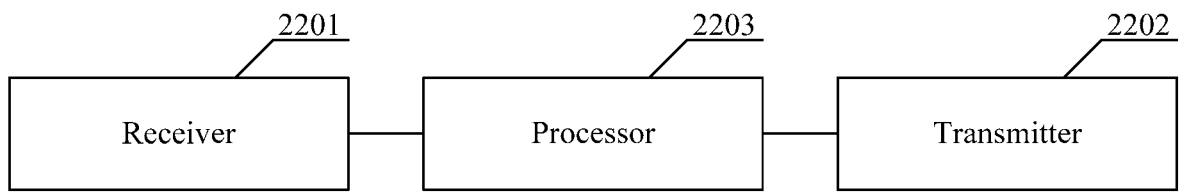
FIG. 22 is a schematic structural diagram of a data transmission device according to an embodiment of the present invention.

Another data transmission device is further provided according to an embodiment of the present invention. The data transmission device is used as a first receiving end, as shown in FIG. 22, the device includes: a receiver 2201, a transmitter 2202 and a processor 2203.

The receiver 2201 is configured to receive a channel request frame from a transmitting end, and receive data from the transmitting end on sub-channels on which a channel response frame is transmitted by the transmitter 2202.

The processor 2203 is configured to determine whether the data transmission device is a destination receiving end for the channel request frame after the channel request frame from the transmitting end is received; if it is determined that the data transmission device is the destination receiving end for the channel request frame, and a sub-channel corresponding to the request frame is idle, instruct the transmitter 2202 to transmit a channel response frame to the transmitting end on the idle sub-channel, where the channel response frame carries second channel indication information and the second channel indication information indicates the sub-channel on which the channel response frame is transmitted.

The transmitter 2202 is configured to transmit the channel response frame to the transmitting end.

By using the second channel indication information to indicate the sub-channel on which the channel response frame is transmitted, the transmitting end can obtain more reliable information. Even if the response frame or the request frame is not received on some sub-channels, the receiving end can still learn, from the information, the channels on which the response frame or the request frame is transmitted by the transmitting end.

In the embodiment of the present invention, a channel response frame transmitted from a receiving end carries second channel indication information and the second channel indication information may flexibly indicate a sub-channel on which the channel response frame is transmitted. In this way, the transmitting end can learn on which sub-channels the channel response frame is transmitted and determine that the sub-channels are idle, without being limited to continuous bandwidth combinations indicated by 3 bits. Therefore, restriction of a location relationship of frequency bands can be overcome, and all combinations of various sub-channels can be indicated.

Specifically, the sub-channels on which the processor 2103 instructs the transmitter 2202 to transmit the channel response frame, are not continuous. Based on the description in the background, the solution in the background can only use continuous idle frequency bands, which wastes frequency band resources. Specifically, in the example in the background, channel 4 is wasted, so that utilization efficiency of the frequency band resources in the technical solution of the background is low. In the embodiment, the idle sub-channels corresponding to the channel response frame received by the transmitting end are not continuous, that is, the channel response frame is received by the transmitting end on discrete sub-channels, therefore the transmitting end can accurately determine whether the sub-channels are idle and then transmit data on idle sub-channels in a discrete manner, thereby avoiding the waste of channel resources and improving the utilization efficiency of the frequency band resources.

Further, an embodiment of the present invention further provides a solution for a situation in which the receiving end receiving the request frame is not the destination receiving end for the request frame, as follows: The processor 2203 is further configured to receive the channel response frame from the destination receiving end for the channel request frame by using the receiver 2201 after a duration of a short inter-frame space time, by listening to the sub-channel corresponding to the channel request frame, if the first receiving end determines that the first receiving end is not the destination receiving end for the channel request frame.

It is determined that the sub-channels corresponding to the channel request frame are busy if the channel response frame from the destination receiving end for the channel request frame is received by the receiver 2201 within a packet control function inter-frame space.

An embodiment of the present invention further provides a solution to update a network allocation vector. Specifically, the processor 2203 is further configured to set a network allocation vector of the sub-channel corresponding to the channel request frame based on duration indication information in the received channel response frame after the channel response frame from the destination receiving end for the channel request frame is received by the receiver 2201; and determine that the network allocation vector of the sub-channel corresponding to the channel request frame does not need to be updated if the channel response frame from the destination receiving end for the channel request frame is not received by the receiver 2201 within the packet control function inter-frame space.

Further, an embodiment of the present invention further provides a case of applying the solution of the embodiment of the present invention to an overlapping basic service set (OBSS) scenario, to further improve utilization efficiency of the network spectrum. The embodiment places emphasis on, a basic service set (BSS) further using an idle channel of a neighbor BSS to assist temporary transmission of a larger amount of data in the OBSS scenario. Specifically, if the sub-channel corresponding to the channel request frame is a sub-channel of a second basic service set, and a first basic service set is a basic service set to which the first receiving end belongs, the processor 2203 is further configured to determine whether the sub-channel corresponding to the channel request frame is available, before the processor 2203 instructs the transmitter 2202 to transmit the channel response frame to the transmitting end; and instruct the transmitter 2202 to transmit the channel response frame to the transmitting end if the sub-channel corresponding to the channel request frame is available.

Optionally, an embodiment of the present invention provides a solution to determine whether the sub-channel is available. Specifically, the processor 2203 is configured to determine that the sub-channel corresponding to the channel request frame is available if it is determined that a signal of the second basic service set is not received on the sub-channel corresponding to the channel request frame within a predetermined duration; or determine whether the sub-channel corresponding to the channel request frame are available in a duration requested by the channel request frame, based on a communication state of the second basic service set.

Optionally, an embodiment of the present invention provides an optional solution for the communication state. Specifically, the communication record includes: the communication record used by the processor 2203 to determine whether the sub-channels are available includes: at least one of terminal cache information, queue information, contention window information, or back off time information of the second basic service set.

Optionally, an embodiment of the present invention further provides a case of applying the solution of the embodiment of the present invention to an OBSS scenario, to further improve utilization efficiency of the network spectrum. The embodiment places emphasis on, a BSS further using an idle channel of the BSS itself in the OBSS scenario. Specifically, if the foregoing data transmission device is an access point of a basic service set, the processor 2203 is further configured to determine whether the basic service set to which the access point belongs includes a specific terminal acting as a receiving end, not transmit the channel response frame on any of sub-channels if the basic service set to which the access point belongs includes a specific terminal acting as a receiving end, and transmit the channel response frame on an idle sub-channel, in the basic service set to which the access point belongs, that does not include a primary channel, if the basic service set to which the access point belongs does not include a specific terminal acting as a receiving end. The foregoing specific terminal refers to a terminal that does not use or does not support the process of the method illustrated in FIG. 1.

Figure 23:
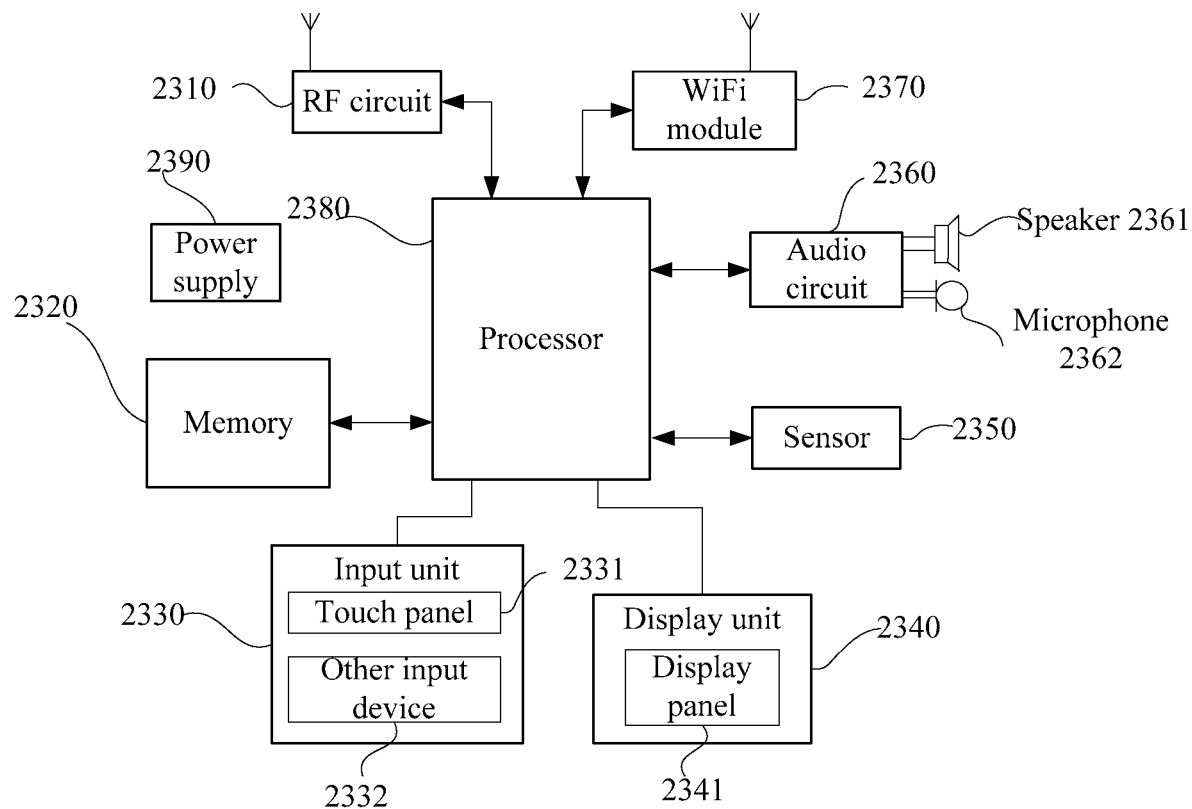
FIG. 23 is a schematic structural diagram of a mobile phone according to an embodiment of the present invention.

As shown in FIG. 23, another data transmission device is further provided according to an embodiment of the present invention. In order to facilitate illustration, only the parts related to the embodiments of the present invention are illustrated, and for the technical details, reference may be made to methods in the embodiments of the present invention. The data transmission device may be a terminal, and the terminal may be any terminal device such as a mobile phone, a tablet computer, a personal digital assistant (PDA), a point of sales (POS) and an onboard computer. A case where the terminal is a mobile phone is taken as an example.

FIG. 23 is a block diagram of part of structure of a mobile phone, which is related to the terminal according to the embodiments of the present invention. Referring to FIG. 23, the mobile phone includes: a radio frequency (RF) circuit 2310, a memory 2320, an input unit 2330, a display unit 2340, a sensor 2350, an audio circuit 2360, a wireless fidelity (WiFi) module 2370, a processor 2380, and a power supply 2390. It can be understood by those skilled in the art that, the structure of the mobile phone illustrated in FIG. 23 is not limited to the mobile phone. Compared with components illustrated in the figure, more or fewer components may be included, or some components may be combined, or the components may be differently arranged.

With reference to FIG. 23, each of the components of the mobile phone is described in detail below.

The RF circuit 2310 may be configured to receive and transmit information, or receive and transmit signals in a call, and particularly, receive downlink information of a base station for the processor 2308 to process, and transmit designed uplink data to a base station. Usually, the RF circuit 2310 includes, but is not limited to, an antenna, at least one amplifier, a transceiver, a coupler, a low noise amplifier (LNA) and a duplexer. In addition, the RF circuit 2310 may also communicate with a network and other devices by means of wireless communication. The wireless communication may use any communication standard or protocol, which includes, but is not limited to, global system of mobile communication (GSM), general packet radio service (GPRS), code division multiple access (CDMA), wideband code division multiple access (WCDMA), long term evolution (LTE), email, and short messaging service (SMS).

The memory 2320 may be configured to store software programs and modules, and the processor 2380 performs function applications of the mobile phone and data processing by running the software programs and modules stored in the memory 2320. The memory 2320 may mainly include a program storing region and a data storing region, where the program storing region may store an operating system, an application program which is needed by at least one function (such as an audio playing function and an image playing function); and the data storing region may store data established based on use of the mobile phone (such as audio data and a phone book). In addition, the memory 2320 may include a high speed random access memory, and may also include a non-volatile memory such as at least one disk memory, a flash memory or other volatile solid-state memory.

The input unit 2330 may be configured to receive inputted number or character information, and generate a key signal input which is related to user setting and function controlling of the mobile phone. Specifically, the input unit 2330 may include a touch panel 2331 and other input device 2332. The touch panel 2331, also referred to as a touchscreen, may collect touch operations of a user which are performed on or near the touch panel (such as operations performed by the user on the touch panel 2331 or near the touch panel 2331, with a proper object or accessory such as a finger or a stylus), and drive a corresponding connecting device based on a preset program. Optionally, the touch panel 2331 may include a touch detecting device and a touch controller. The touch detecting device detects a touch location of the user, detects a signal generated due to a touch operation, and transmits the signal to the touch controller; the touch controller receives touch information from the touch detecting device, converts the touch information to coordinates of a touch point, transmits the coordinates to the processor 2380, and receive an instruction from the processor 2380 and execute the instruction. In addition, the touch panel 2331 may be resistive, capacitive, infrared or surface acoustic, and so on. In addition to the touch panel 2331, the input unit may further include other input device 2332. Specifically, the other input device 2332 may include, but is not limited to, one or more of a physical keyboard, a function button (such as a volume controlling button or a switch button), a trackball, a mouse and an operating rod.

The display unit 2340 may be configured to display information inputted by the user or provide information and menus of the mobile phone to the user. The display unit 2340 may include a display panel 2341. Optionally, the display panel 2341 may be configured in a form of liquid crystal display (LCD), or organic light-emitting diode (OLED) and so on. Further, the touch panel 2331 may cover the display panel 2341, and if the touch panel 2331 detects the touch operation on or near the touch panel, the touch panel transmits the touch operation to the processor 2380 to determine a type of a touch event, then the processor 2380 provides a corresponding visual output on the display panel 2341 based on the type of touch event. In FIG. 23, although the touch panel 2331 and the display panel 2341 realize an input function and an output function of the mobile phone as two individual components, the touch panel 2331 and the display panel 2341 may be integrated to realize the input function and the output function of the mobile phone in some embodiments.

The mobile phone may further include the at least one sensor 2350, such as a light sensor, a motion sensor and other sensor. Specifically, the light sensor may include an ambient light sensor and a proximity sensor, the ambient light sensor may adjust brightness of the display panel 2341 based on brightness of ambient light, and the proximity sensor may close the display panel 2341 and/or backlight if the mobile phone moves to an ear. As one of motion sensor, an acceleration sensor may detect magnitude of an acceleration in each of directions (there are usually three axes), detect magnitude and direction of gravity while being at rest, and be applied to an application for recognizing a gesture of the mobile phone (such as switching between portrait and landscape orientation, a related game or calibration of gesture of a magnetometer) and to a function related to vibration recognition (such as a pedometer or a click). Other sensors which may be provided with the mobile phone, such as a gyroscope, a barometer, a hygrometer, a thermometer or an infrared sensor, are not described herein.

The audio circuit 2360, a speaker 2361 and a microphone 2361 may provide an audio interface between the user and the mobile phone. The audio circuit 2360 may transmit an electrical signal, which is converted from received audio data, to the speaker 2361, so as to convert it to an audio signal by the speaker 2361 to output. On the other hand, the microphone 2362 converts a collected audio signal to an electrical signal, the electrical signal is received by the audio circuit 2360 and then converted to audio data, and after the audio data is outputted to and processed by the processor 2380, the audio data is sent to, for example, another mobile phone via the RF circuit 2310, or the audio data is outputted to the memory 2320 for further processing.

WiFi belongs to a short-distance wireless transmission technology. The mobile phone may help the user to receive and transmit emails, browse a web page, and access to streaming media with WiFi module 2370, and the WiFi module provides wireless broadband internet access to the user. Although the WiFi module 2370 is illustrated in FIG. 23, it can be understood that, the WiFi module 2370 is not a necessary constituent of the mobile phone, and may be omitted based on requirements without changing essence of the present invention.

The processor 2380 is a control center of the mobile phone, which connects each part of the mobile phone through interfaces and lines, and performs various functions of the mobile phone and data processing, by running or executing the software programs or the modules stored in the memory 2320 and calling data stored in the memory 2320, thereby realizing overall listening to of the mobile phone. Optionally, the processor 2308 may include one or more processing units. Preferably, the processor 2308 may integrate an application processor and a modulation-demodulation processor. The application processor is mainly configured to process operating systems, user interfaces and applications, and the modulation-demodulation processor is mainly configured to process wireless communication. It can be understood that the modulation-demodulation processor may not be integrated into the processor 2380.

The mobile phone further includes the power supply 2390 (such as a battery) which is configured to power each of the components. Preferably, the power supply may be logically connected with the processor 2380 via a power supply management system, so that functions such as managing charging, discharging and power consumption can be realized with the power supply management system.

Although not illustrated, the mobile phone may further include a camera, a bluetooth module, and so on, which is not described herein.

In an embodiment of the present invention, the processor 2380 included in the terminal further has the following functions.

If the mobile phone is used as a transmitting end, the processor 2380 is configured to receive a channel response frame from a first receiving end; parse the channel response frame to obtain second channel indication information after the channel response frame from the first receiving end is received, where the second channel indication information indicates a sub-channel on which the channel response frame is transmitted; and determine that the sub-channel on which the channel response frame is transmitted is idle.

Based on the embodiment of the present invention, a channel response frame from a receiving end carries second channel indication information, and the second channel indication information may indicate a sub-channel on which the channel response frame is transmitted. In this way, the transmitting end can learn on which sub-channels the channel response frame is transmitted and determine that the sub-channels are idle, without being limited to continuous bandwidth combinations indicated by 3 bits. Therefore, restriction of a location relationship of frequency bands can be overcome, and all combinations of various sub-channels can be indicated.

Further, the channel request frame further carries first channel indication information, and the first channel indication information indicates the sub-channels on which the channel request frame is transmitted.

By using the first channel indication information to indicate the sub-channels on which the channel request frame is transmitted, the receiving end can obtain more reliable information. Even if the channel request frame is not received on some sub-channels, the receiving end can still learn, from the information, the channels on which the channel request frame is transmitted by the transmitting end.

Specifically, the sub-channels on which the channel response frame is transmitted, indicated by the second channel indication information determined by the processor 2380, are not continuous. Based on the description in the background, the solution in the background can only use continuous idle frequency bands, which wastes frequency band resources. Specifically, in the example in the background, channel 4 is wasted, so that utilization efficiency of the frequency band resources in the technical solution of the background is low. In the embodiment, the idle sub-channels corresponding to the channel response frame received by the transmitting end are not continuous, that is, the channel response frame is received by the transmitting end on discrete sub-channels, therefore the transmitting end can accurately determine whether the sub-channels are idle and then transmit data on idle sub-channels in a discrete manner, thereby avoiding the waste of channel resources and improving the utilization efficiency of the frequency band resources.

Further, an embodiment of the present invention further provides an implementation solution for channel determination before the data is transmitted as follows: The processor 2380 is further configure to, before transmitting the data to the first receiving end on the sub-channel that is determined to be idle, determine whether the idle sub-channel can be used adequately, instruct to transmit the channel request frame to a second receiving end on the at least two sub-channels if the idle sub-channel cannot be used adequately and instruct to transmit data to the first receiving end on the idle sub-channel by means of orthogonal frequency division multiplexing, orthogonal frequency division multiple access or frequency division multiplexing if the idle sub-channel can be used adequately.

Optionally, an embodiment of the present invention further provides a process of determining whether the current idle sub-channel can be used adequately. Specifically, the processor 2380 being configured to determine whether the idle sub-channel can be used adequately includes: determining whether a ratio of a quantity of the idle sub-channel to a quantity of the sub-channels on which the channel request frame is transmitted is greater than a predetermined threshold, determining that the idle sub-channels are not used adequately if the ratio is greater than the predetermined threshold and determining that the idle sub-channels can be used adequately if the ratio is not greater than the predetermined threshold; or determining whether the idle sub-channels include a primary channel, and determining that the idle sub-channels are not used adequately if the idle sub-channels do not include the primary channel.

Optionally, an embodiment of the present invention further provides a case of applying the solution of the embodiment of the present invention to an overlapping basic service set (Overlapping Basic Service Set, OBSS) scenario, to further improve utilization efficiency of the network spectrum. The embodiment places emphasis on, a basic service set (Basic Service Set, BSS) further using an idle channel of a neighbor BSS to assist temporary transmission of a larger amount of data in the OBSS scenario. Specifically, the foregoing apparatus for data transmission is in a first basic service set, and the at least two sub-channels in the sub-channels for transmission include a sub-channel of a second basic service set.

Optionally, an embodiment of the present invention further provides another solution to determine whether the sub-channels are idle in a scenario with a primary channel as follows: The processor 2380 is further configured to, if it is determined based on the channel response frame that the primary channel of the basic service set is idle, and the basic service set includes a busy sub-channel, determine whether busyness of the busy sub-channel is caused by data transmission in the basic service set, and determine that the busy sub-channel is an idle sub-channel if the busyness of the busy sub-channel is not caused by data transmission in the basic service set.

If the mobile phone is used as a first receiving end, the processor 2380 is configured to determine whether the mobile phone itself is a destination receiving end for channel request frame after the channel request frame from a transmitting end is received, and if it is determined that the mobile phone itself is a destination receiving end for the channel request frame and a sub-channel corresponding to the channel request frame is idle, instruct to transmit a channel response frame to the transmitting end on the idle sub-channel, where the channel response frame carries second channel indication information and the second channel indication information indicates the sub-channel on which the channel response frame is transmitted.

By using the second channel indication information to indicate the sub-channel on which the channel response frame is transmitted, the transmitting end can obtain more reliable information. Even if the response frame or the request frame is not received on some sub-channels, the receiving end can still learn, from the information, the channels on which the response frame or the request frame is transmitted by the transmitting end.

In the embodiment of the present invention, a channel response frame transmitted from a receiving end carries second channel indication information and the second channel indication information may flexibly indicate a sub-channel on which the channel response frame is transmitted. In this way, the transmitting end can learn on which sub-channels the channel response frame is transmitted and determine that the sub-channels are idle, without being limited to continuous bandwidth combinations indicated by 3 bits. Therefore, restriction of a location relationship of frequency bands can be overcome, and all combinations of various sub-channels can be indicated.

Specifically, the sub-channel on which the channel response frame is transmitted, indicated by the processor 2308, is not continuous. Based on the description in the background, the solution in the background can only use continuous idle frequency bands, which wastes frequency band resources. Specifically, in the example in the background, channel 4 is wasted, so that utilization efficiency of the frequency band resources in the technical solution of the background is low. In the embodiment, the idle sub-channels corresponding to the channel response frame received by the transmitting end are not continuous, that is, the channel response frame is received by the transmitting end on discrete sub-channels, therefore the transmitting end can accurately determine whether the sub-channels are idle and then transmit data on idle sub-channels in a discrete manner, thereby avoiding the waste of channel resources and improving the utilization efficiency of the frequency band resources.

Further, an embodiment of the present invention further provides a solution for a situation in which the receiving end receiving the request frame is not the destination receiving end for the request frame, as follows: The processor 2308 is further configured to receive the channel response frame from the destination receiving end for the channel request frame after a duration of a short inter-frame space time, by listening to the sub-channel corresponding to the channel request frame, if the first receiving end determines that the first receiving end is not the destination receiving end for the channel request frame; and determine that the sub-channel corresponding to the channel request frame is busy, if the channel response frame from the destination receiving end for the channel request frame is received within a packet control function inter-frame space.

An embodiment of the present invention further provides a solution to update a network allocation vector. Specifically, the foregoing processor 2380 is further configured to set a network allocation vector of a sub-channel corresponding to the channel request frame based on duration indication information in the received channel response frame after the channel response frame from the destination receiving end for the channel request frame is received; and determine that the network allocation vector of the sub-channel corresponding to the channel request frame does not need to be updated, if the channel response frame from the destination receiving end for the channel request frame is not received within the packet control function inter-frame space.

Further, an embodiment of the present invention further provides a case of applying the solution of the embodiment of the present invention to an OBSS scenario, to further improve utilization efficiency of the network spectrum. The embodiment places emphasis on, a BSS further using an idle channel of a neighbor BSS to assist temporary transmission of a larger amount of data in the OBSS scenario. Specifically, if the sub-channel corresponding to the channel request frame is a sub-channel of a second basic service set, and a first basic service set is a basic service set to which the first receiving end belongs; the processor 2380 is further configured to determine whether the sub-channel corresponding to the channel request frame is available, before the processor 2380 instructs the transmitter 2202 to transmit the channel response frame to the transmitting end, and instructs the transmitter 2202 to transmit the channel response frame to the transmitting end if the sub-channel corresponding to the channel request frame is available.

An embodiment of the present invention further provides a solution to determine whether the sub-channel is available. Specifically, the processor 2380 is configured to determine that the sub-channel corresponding to the channel request frame is available if it is determined that a signal of the second basic service set is not received on the sub-channel corresponding to the channel request frame within a predetermined duration; or determine whether the sub-channel corresponding to the channel request frame is available in a duration requested by the channel request frame, based on a communication state of the second basic service set.

Optionally, an embodiment of the present invention provides an optional solution for the communication state. Specifically, the communication record includes: the communication record used by the processor 2308 to determine whether the sub-channels are available includes: at least one of terminal cache information, queue information, contention window information, or back off time information of the second basic service set.

It should be noted that, the foregoing user equipment and wireless access device are distinguished by logical functions, and the distinguishing is not limited to the foregoing approach, as long as corresponding functions can be realized. In addition, specific names of the various functional units are only for distinguishing one from another and are not used to limit the protection scope of the present invention.

In addition, it can be understood by those skilled in the art that, all or some of the steps in the method embodiments may be achieved by related hardware instructed by a program. The program may be stored in a computer readable storage medium, and the storage medium may be a read-only memory, a magnetic disk or an optical disk, and so on.

The foregoing are only embodiments of the present invention, and the protection scope of the present invention is not limited herein. Changes and substitutions easily made by those skilled in the art within the technical scope disclosed by the embodiments of the present invention should fall within the protection scope of the present invention. Therefore, the protection scope of the present invention should be defined by the protection scope of the claims.

What is claimed is:

1. A data transmission method, comprising:
    transmitting, by a transmitting end in a first basic service set, a channel request frame to a first receiving end on at least two sub-channels which comprise a first sub-channel of a second basic service set;
    parsing, by the transmitting end after receiving a channel response frame from the first receiving end, the channel response frame to obtain second channel indication information, wherein the second channel indication information indicates a second sub-channel on which the channel response frame is transmitted; and determining that the second sub-channel is idle; and
    transmitting, by the transmitting end, data to the first receiving end on the second sub-channel that is determined to be idle.

2. The method according to claim 1, wherein when the transmitting end is an access point of a basic service set, the method further comprises:
    determining whether the basic service set to which the access point belongs comprises a terminal acting as a receiving end; when the basic service set comprises the terminal, transmitting, by the transmitting end, the channel request frame comprises:
    transmitting, by the access point, the channel request frame on all sub-channels of the basic service set; and
    when the basic service set to which the access point belongs does not comprise the terminal acting, transmitting, by the transmitting end, the channel request frame comprises:
    transmitting, by the access point, the channel request frame on an idle sub-channel in the basic service set that does not comprise a primary channel.

3. The method according to claim 2, wherein when it is determined based on the channel response frame that the primary channel of the basic service set is idle, and the basic service set comprises a busy sub-channel, determining whether busyness of the busy sub-channel is caused by data transmission in the basic service set, and determining that the busy sub-channel is an idle sub-channel when the busyness of the busy sub-channel is not caused by data transmission in the basic service set.

4. A data transmission device in a first basic service set, comprising a processor and a non-transitory computer readable medium having a plurality of computer readable instructions stored thereon that, when executed by the processor, cause the processor to:

transmit a channel request frame to a first receiving end on at least two sub-channels which comprise a first sub-channel of a second basic service set;

receive a channel response frame from the first receiving end after the channel request frame is transmitted;

parse the channel response frame to obtain second channel indication information after the channel response frame from the first receiving end is received, wherein the second channel indication information indicates a second sub-channel on which the channel response frame is transmitted; and determine that the second sub-channel is idle; and transmit data to the first receiving end on the second sub-channel that is determined to be idle.

5. The device according to claim 4, the data transmission device is an access point of a basic service set, the computer readable instructions when executed by the processor, cause the processor to:

determine whether the basic service set to which the access point belongs comprises a specific terminal acting as a receiving end;

transmit the channel request frame on all sub-channels of the basic service set when the basic service set to which the access point belongs comprises a terminal acting as a receiving end; and transmit the channel request frame on an idle sub-channel in the basic service set that does not comprise a primary channel when the basic service set to which the access point belongs does not comprise the terminal acting as the receiving end.

6. The device according to claim 5, wherein when it is determined based on the channel response frame that the primary channel of the basic service set is idle, and the basic service set comprises a busy sub-channel, the processor is configured to determine whether busyness of the busy sub-channel is caused by data transmission in the basic service set, and determine that the busy sub-channel is an idle sub-channel when the busyness of the busy sub-channel is not caused by data transmission in the basic service set.

* * * * *